United States Patent
Chen et al.

(10) Patent No.: US 11,895,466 B2
(45) Date of Patent: Feb. 6, 2024

(54) METHODS AND SYSTEMS FOR DETERMINING PARAMETERS OF AUDIO DEVICES

(71) Applicant: HANSONG (NANJING) TECHNOLOGY LTD., Jiangsu (CN)

(72) Inventors: Wei Chen, Nanjing (CN); Kunpeng Zhang, Nanjing (CN)

(73) Assignee: HANSONG (NANJING) TECHNOLOGY LTD., Nanjing (CN)

( * ) Notice: Subject to any disclaimer, the term of this patent is extended or adjusted under 35 U.S.C. 154(b) by 119 days.

(21) Appl. No.: 17/646,152

(22) Filed: Dec. 28, 2021

(65) Prior Publication Data

US 2022/0210588 A1 Jun. 30, 2022

(30) Foreign Application Priority Data

Dec. 28, 2020 (CN) .......................... 202011572703.3
Dec. 8, 2021 (CN) .......................... 202111494130.1

(51) Int. Cl.
| | |
|---|---|
| H04R 29/00 | (2006.01) |
| G06T 7/70 | (2017.01) |
| G06T 15/00 | (2011.01) |
| G06T 7/60 | (2017.01) |
| H04N 23/698 | (2023.01) |

(52) U.S. Cl.
CPC .............. *H04R 29/00* (2013.01); *G06T 7/60* (2013.01); *G06T 7/70* (2017.01); *G06T 15/00* (2013.01); *H04N 23/698* (2023.01); *G06T 2207/20081* (2013.01); *G06T 2207/30244* (2013.01); *H04R 2430/01* (2013.01)

(58) Field of Classification Search
CPC ....................................................... H04R 29/00
See application file for complete search history.

(56) References Cited

U.S. PATENT DOCUMENTS

| | | | |
|---|---|---|---|
| 9,466,207 | B2 | 10/2016 | Jang |
| 10,529,225 | B2 | 1/2020 | Yoon et al. |
| 2011/0135125 | A1 | 6/2011 | Zhan et al. |
| 2014/0205134 | A1 | 7/2014 | Yagihashi et al. |
| 2014/0247978 | A1 | 9/2014 | Devin et al. |
| 2016/0187453 | A1 | 6/2016 | Wang |
| 2017/0201847 | A1* | 7/2017 | Fujita ...................... H04S 7/301 |

(Continued)

FOREIGN PATENT DOCUMENTS

| | | |
|---|---|---|
| CN | 102083005 A | 6/2011 |
| CN | 103634476 B | 8/2016 |

(Continued)

OTHER PUBLICATIONS

Qiu, Chun, Production of Multi-channel TV Programs, Advanced Television Engineering, 2004, 12 pages.

(Continued)

*Primary Examiner* — Olisa Anwah
(74) *Attorney, Agent, or Firm* — METIS IP LLC

(57) ABSTRACT

The embodiment of this specification discloses a method and system for determining parameters of audio devices, the method includes: obtaining at least one of image information and/or audio information of a target space where a target audio device is located; and determining a parameter of the target audio device based on the at least one of image information and/or the audio information.

15 Claims, 9 Drawing Sheets

(56) References Cited

U.S. PATENT DOCUMENTS

| | | |
|---|---|---|
| 2019/0075418 A1 | 3/2019 | Shi et al. |
| 2019/0116647 A1 | 4/2019 | Deixler et al. |
| 2019/0246229 A1 | 8/2019 | Wardle et al. |
| 2019/0297415 A1 | 9/2019 | Huang et al. |
| 2020/0245435 A1 | 7/2020 | Meerbeek et al. |
| 2020/0389623 A1 | 12/2020 | Pance et al. |
| 2021/0280179 A1 | 9/2021 | Liu et al. |

FOREIGN PATENT DOCUMENTS

| | | |
|---|---|---|
| CN | 106686520 A | 5/2017 |
| CN | 106954125 A | 7/2017 |
| CN | 105277921 B | 12/2017 |
| CN | 107801120 A | 3/2018 |
| CN | 108347673 A | 7/2018 |
| CN | 108513227 A | 9/2018 |
| CN | 108551608 A | 9/2018 |
| CN | 108833782 A | 11/2018 |
| CN | 109076161 A | 12/2018 |
| CN | 109218816 A | 1/2019 |
| CN | 109831735 A | 5/2019 |
| CN | 110646002 A | 1/2020 |
| CN | 110909146 A | 3/2020 |
| CN | 111341303 A | 6/2020 |
| CN | 111757241 A | 10/2020 |
| EP | 3713255 A1 | 9/2020 |
| JP | 2004228737 A | 8/2004 |
| JP | 2018056889 A | 4/2018 |
| WO | 2012158307 A1 | 11/2012 |

OTHER PUBLICATIONS

First Office Action in Chinese Application No. 202011572703.3 dated Feb. 7, 2021, 12 pages.

Dong, Xueting et al., A Design of Real-Time Reverberation Generating System Based on Virtual Reality Model, Journal of Fudan University (Natural Science), 58(3): 358-362, 2019.

Chen, Yan, A study on the Acoustics of Long Enclosures, China Doctoral Dissertation Full-text Database Information Science and Technology, 2012, 91 pages.

Zhao, Huapeng et al., Modeling of Current Sources Near a Wall of Reverberation Chambers in Discrete Singular Convolution Method, APEMC, 250-252, 2017.

* cited by examiner

200

210

Obtaining at least one of image information and/or an audio information of the target space where the target audio device is located;

220

Determining the parameters of the target audio device based on the at least one of image information and/or the audio information.

FIG. 2

METHODS AND SYSTEMS FOR DETERMINING PARAMETERS OF AUDIO DEVICES

CROSS-REFERENCE TO RELATED APPLICATION

This application claims priority of Chinese Patent Application No. 202011572703.3, filed on Dec. 28, 2020, and Chinese Patent Application No. 202111494130.1, filed on Dec. 8, 2021, the contents of which are entirely incorporated herein by reference.

TECHNICAL FIELD

The present disclosure relates to the field of audio devices, and more particularly to a method and a system for determining parameters of audio devices.

BACKGROUND

With the rapid development of the offline service industry, the applications of audio devices are becoming more and more extensive. During use, the user can adjust the parameters of the audio devices to get a better listening experience. However, most audio devices only have basic adjustment functions, and various influencing factors are not considered when determining the parameters of audio devices, such as the environmental factors, location and angle factors where the audio devices are located. In addition, most users do not have the professionalism of self-adjusting the parameters of audio devices, and the professional listening environment for accurately determining the parameters of audio devices. As a result, the determination of parameters of audio devices is not comprehensive and accurate enough, and it is difficult to obtain better audio devices effects, thereby affecting the user's listening experience.

Therefore, there is a need to provide a method and a system for determining the parameters of audio devices to improve the comprehensiveness and accuracy of the determination of the parameters of audio devices, improve the sound effect of the audio devices, and provide users with a high-quality listening experience.

SUMMARY

One of the embodiments of the specification provides a method for determining parameters of audio devices, the method including: obtaining at least one of image information or audio information of a target space where a target audio device is located; and determining a parameter of the target audio device based on the at least one of image information or the audio information.

One of the embodiments of the specification provides a system for determining parameters of audio devices, the system including: at least one storage device comprising a set of instructions; and at least one processor configured to communicate with the at least one storage device, wherein, when the set of instructions is executed, the at least one processor is configured to direct the system to perform operations including: obtaining at least one of image information or audio information of a target space where a target audio device is located; and determining a parameter of the target audio device based on the at least one of image information or the audio information.

One of the embodiments of the specification provides a device for determining parameters of audio devices, the device including: at least one storage device including a set of instructions; and at least one processor configured to communicate with the at least one storage device. Wherein, when the instruction is executed, the at least one processor is configured to direct the at least one processor to perform operations including: obtaining at least one of image information or audio information of a target apace where a target audio device is located; and determining a parameter of the target audio device based on the at least one of image information or the audio information.

One of the embodiments of the specification provides a non-transitory computer-readable medium, comprising instructions that, when executed by at least one processor, direct the at least one processor to perform operations including: obtaining at least one of image information or audio information of a target space where a target audio device is located; and determining a parameter of the target audio device based on the at least one of image information or the audio information.

BRIEF DESCRIPTION OF THE DRAWINGS

The specification will be further described in the form of exemplary embodiments, and these exemplary embodiments will be described in detail with the drawings. These embodiments are not restrictive. In these embodiments, the same number represents the same structure, in which:

FIG. 2 illustrates an exemplary diagram of a method for determining the parameters of audio device according to some embodiments of the specification;

DETAILED DESCRIPTION

Figure 1:
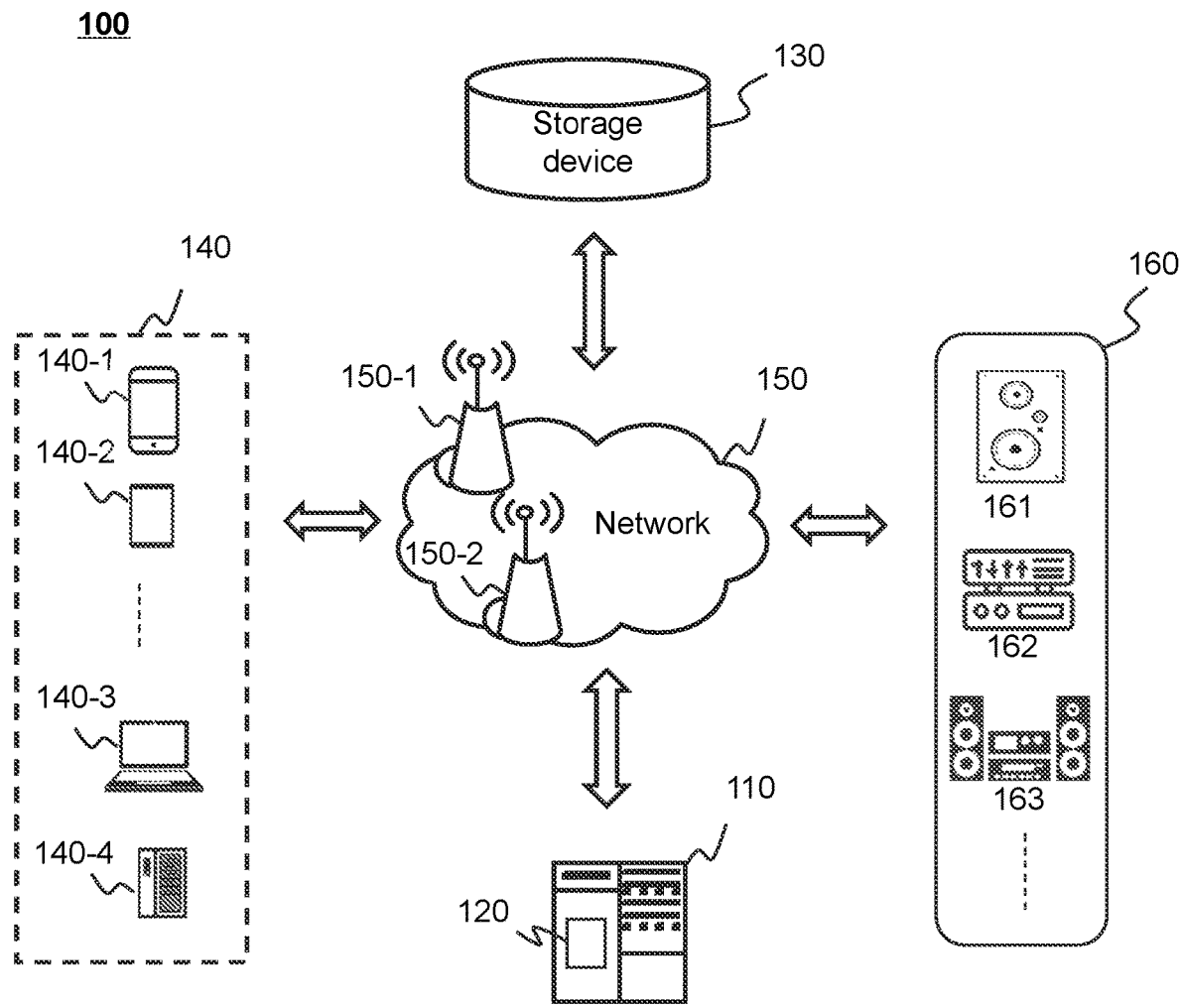
FIG. 1 illustrates an application scenario of an audio device adjustment system according to some embodiments of the specification.

In order to more clearly illustrate the technical solutions of the embodiments of the present disclosure, the following will briefly introduce the drawings that need to be used in the description of the embodiments. Obviously, the drawings in the following description are only some examples or embodiments of the disclosure. For those of ordinary skill in the art, without creative work, the disclosure can be applied to the application according to these drawings. Other similar scenarios. Unless it is obvious from the language environment or otherwise stated, the same reference numbers in the drawings represent the same structure or operation.

It should be understood that the "system", "device", "unit" and/or "module" used herein is a method for distinguishing different components, elements, parts, parts, or assemblies of different levels. However, if other words can achieve the same purpose, the words can be replaced by other expressions.

As shown in the present disclosure and the claims, unless the context clearly suggests exceptional circumstances, the words "a", "an", "an" and/or "the" do not specifically refer to the singular, but may also include the plural. Generally speaking, the terms "including" and "contain" only suggest that the operations and elements that have been clearly identified are included, and these operations and elements do not constitute an exclusive list, and the method or device may also include other operations or elements.

Flow charts are used in the present disclosure to illustrate the operations performed by the system according to the embodiments of the present disclosure. It should be understood that the preceding or following operations are not necessarily performed precisely in order. Instead, the individual operations can be processed in reverse order or simultaneously. At the same time, users can also add other operations to these processes, or remove an operation or several operations from these processes.

FIG. 1 illustrates an application scenario of a audio adjustment system according to some embodiments of this specification. As shown in the exemplary application scenario, the audio adjustment system 100 may include a server 110, a processor 120, a storage device 130, a user device 140, a network 150, and an audio device 160.

In some embodiments, the audio adjustment system 100 may be used to determine audio parameters. The audio adjustment system 100 may be applied to various offline scenarios where audio devices are used. For example, residential rooms, restaurants, coffee shops, shopping malls, performance stages, and movie theaters, etc. The audio adjustment system 100 can determine the optimal audio parameters of the audio device by implementing the methods and/or the processes disclosed in the specification, so as to provide the user with the highest quality of listening effect and improve the user's listening experience.

In some embodiments, a plurality of images of the above scenes and/or listening positions input by the user, as well as video information and/or audio information, may be obtained through the user device 140. These data are processed by the server 110 to determine the optimal audio parameters of audio devices. The server 110 may obtain the data on the storage device 130 or save the data to the storage device 130 during processing, and may also read data from other sources through the network 150 and output the data to other target objects. In some embodiments, at least part of the processing operation of determining the audio parameters may be performed on the user device 140. The operations in the specification may be performed by the processor 120 executing program instructions. The above method is only for convenience of understanding, the system may also implement the method in this specification in other feasible operation modes.

In some embodiments, the server 110, the user device 140, and other possible system components may include a storage device 130.

In some embodiments, the server 110, the user device 140, and other possible system components may include a processor 120.

The server 110 may be used to manage resources and process data and/or information from at least one component of the system or an external data source (for example, a cloud data center). In some embodiments, the server 110 may be a single server or a server group. The server group may be centralized or distributed (e.g., server 110 may be a distributed system). In some embodiments, the server 110 may be local or remote. In some embodiments, the server 110 may be implemented on a cloud platform. For example, the cloud platform may include a private cloud, a public cloud, a hybrid cloud, a community cloud, a distributed cloud, an inter-cloud, a multi-cloud, or the like, or any combination thereof. The server 110 may include a processor 120.

The processor 120 may process data and/or information obtained from other devices or system components. The processor 120 may execute program instructions based on these data, information, and/or processing results to perform one or more functions described in the specification. For example, the processor 120 may access information and/or data stored in the user device 140, the audio device 160, and/or the storage device 130 via the network 150. In some embodiments, the server 110 may be based on the audio information obtained by the user device 140, the video information obtained by the user device 140 and/or the displacement information of the user device 140, the panoramic image obtained by the user device 140 and/or listening position obtained by the user device 140, determine the parameters of the audio device 160. In some embodiments, the server 110 may determine the parameters of the audio device 160 based on VR (Virtual Reality, virtual reality) technology.

In some embodiments, the processor 120 may include one or more sub-processing devices (for example, a single-core processing device or a multi-core and multi-core processing device). The processor 120 may include a central processing unit (CPU), an application-specific integrated circuit (ASIC), an application-specific instruction-set processor (ASIP), a graphics processing unit (GPU), a microprocessor, or the like, or any combination thereof.

The storage device 130 may be used to store data and/or instructions. In some embodiments, the storage device 130 may communicate with the server 110, the user device 140, and/or the audio device 160 based on connecting to the network 150. In some embodiments, the storage device 130 may be a part of the server 110, the user device 140, and/or the audio device 160, or may be independent. The storage device 130 may include one or more storage components, and each storage component may be an independent device or a part of other devices. In some embodiments, the storage device 130 may include a random access memory (RAM), a read only memory (ROM), etc., or any combination thereof. Exemplarily, the mass storage device may include a magnetic disk, an optical disk, and a solid-state disk, etc. In some embodiments, the storage device 130 may be implemented on a cloud platform. The storage device 130 may store audio data, video data, displacement data, position data, image data, etc. obtained through the user device 140.

Data refers to the digital representation of information, and may include various types, such as sound data, binary data, text data, image data, and video data, etc. Instructions refer to programs that may control equipment or devices to perform specific functions.

The user device 140 refers to one or more terminal devices or software used by the user. In some embodiments, the user device 140 may be used by one or more users, may include users who directly use the audio listening service, and may also include other related users. In some embodiments, the user device 140 may be one or any combination of devices having input and/or output functions. Such as, a User terminal 140-1, a tablet computer 140-2, a laptop computer 140-3, a desktop computer 140-4. In some embodiments, the user terminal 140-1 may include a wearable device, a smart user device, etc., or any combination thereof. In some embodiments, the smart user device may include a smart phone, a personal digital assistant (PDA), a game device, a navigation device, a handheld terminal (POS), etc., or any combination thereof. In some embodiments, the desktop computer 140-4 may be a small computer, a television, etc.

In some embodiments, the user device 140 may include a camera and a microphone. The camera may be one of the components of the module of the user device 140 that performs the video information input function, and the microphone may be one of the components of the module of the user device 140 that performs the audio input function. In some embodiments, the user device 140 may be one device or any combination of devices that have an input and/or output function, an image obtaining function, a video information obtaining function, or an audio information obtaining function. In some embodiments, the user device 140 may obtain the VR scene of the audio-visual space where the audio device is located, and upload the VR scene to the server 110 to determine a plurality of test positions and obtain a plurality of shooting locations. In some embodiments, the user device 140 may be used to obtain video information including the audio device 160, and may also be used to obtain audio information played by the audio device 160. In some embodiments, the user can move in the space while shooting the video to adjust the content of the video. In some embodiments, the user device 140 may have a built-in motion sensor, and the built-in motion sensor may be used to obtain motion information of the user during the shooting process, for example, moving direction, speed, distance, etc.

In some embodiments, other user device 140 with input and/or output functions may include an audio control terminal set in a public place or a home environment. In some embodiments, the user may refer to a home owner, audio device user, or other service requester. The above examples are only used to illustrate the breadth of the scope of the user device 140 and not to limit its scope.

The network 150 may connect various components of the system and/or connect the system and external resource parts. The network 150 enables communication between various components and with other parts outside the audio adjustment system 100 to facilitate the exchange of data and/or information. In some embodiments, the network 150 may be any one or more of a wired network or a wireless network. The network 150 may include any suitable network that can be adapted for information and/or data exchange. For example, the network 150 may include a cable network, a fiber optic network, a telecommunication network, the Internet, a local area network (LAN), a wide area network (WAN), a wireless local area network (WLAN), a metropolitan area network (MAN), a Bluetooth network, etc. or any of them combination. The network connection between the various parts can be in one of the above-mentioned ways, or in multiple ways. In some embodiments, the network may be a variety of topological structures such as point-to-point, shared, and centralized, or a combination of multiple topologies. In some embodiments, the network 150 may include one or more network access points. For example, the network 150 may include wired or wireless network access points, such as base stations and/or network exchange points 150-1, 150-2, . . . , through which one or more components of the audio adjustment system 100 can be connected to the network 150 to exchange data and/or information.

The audio device 160 may be a system composed of a combination of devices having a function of converting audio signals into sounds for playback. In some embodiments, the composition of the audio device 160 may include a power amplifier, a peripheral device (including a compressor, an effect, an equalizer, VCD, DVD, etc.), a speaker (stereo speakers, loudspeakers), a mixer, a microphone, and a display device, etc. As shown in FIG. 1, the audio device 160 may include other audio playback devices such as a speaker 161, an audio signal processing device 162, and a combined audio device 163. In some embodiments, the composition of the audio device 160 may include a front speaker, a rear speaker, a center surround speaker, and a subwoofer speaker, etc.

FIG. 2 illustrates an exemplary diagram of a method for determining the parameters of an audio device according to some embodiments of the specification. In some embodiments, the process 200 may be implemented as a set of instructions (for example, an application) stored in a storage device (for example, the storage device 130). The processing device (for example, the server 110 and/or one or more modules) may execute the instruction set, and when the instruction is executed, the processing device may be configured to perform the process 200. The operation of the illustrated process presented below is for illustration. In some embodiments, the process 200 may be completed with one or more additional operations not described and/or one or more operations not discussed. In addition, the operation sequence of the process 200 shown in FIG. 2 and the content described below do not limit the scope of the application. As shown in FIG. 2, the process 200 may be executed by the processor 120.

In operation 210, the processing device (for example, the obtaining module 910) may obtain at least one of image information and/or an audio information of the target space where the target audio device is located.

The image information of the target space includes panoramic images, video information, etc. The audio information of the target space refers to the audio information emitted by the instruments or equipment in the target space.

In some embodiments, the obtaining module 910 may obtain the image information and/or the audio information of the target space in a variety of ways. For example, the obtaining module 910 may directly read the image information and/or the audio information from a storage device (for example, the storage device 130). For another example, the obtaining module 910 may obtain the image information and/or the audio information from a user device (for example, the user device 140).

Figure 3:
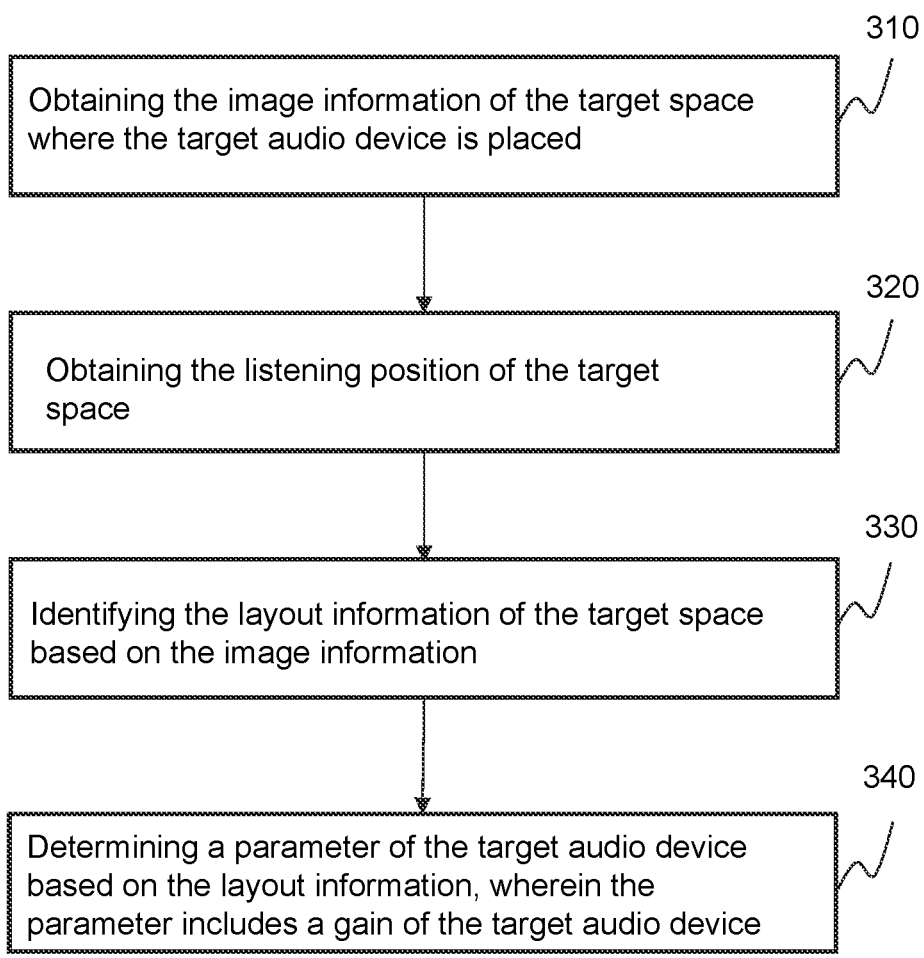
FIG. 3 illustrates an exemplary diagram of a method for determining the parameters of audio device according to other embodiments of the specification.
Figure 6:
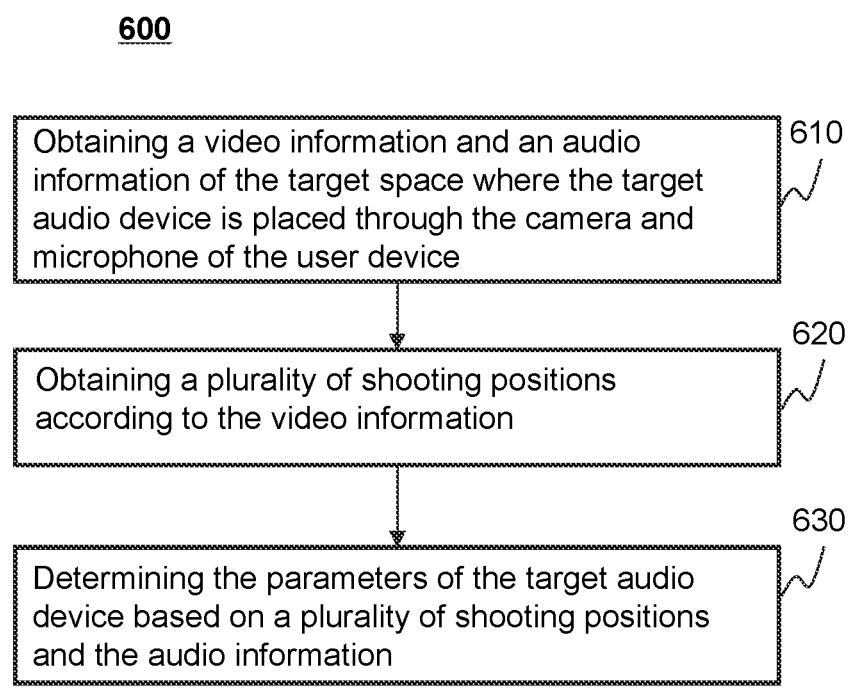
FIG. 6 illustrates an exemplary diagram of a method for determining the parameters of audio device according to other embodiments of the specification.

For the description of obtaining the at least one of image information and/or the audio information of the target space where the target audio device is located, please refer to the related descriptions of FIG. 3 and FIG. 6.

In operation 220, The processing device (for example, the determining module 920) may determine the parameters of the target audio device based on the at least one of image information and/or the audio information.

In some embodiments, the determining module 920 may determine the parameters of the target audio device based on the image information. For example, the determination module 920 may determine the parameters of the target audio device, such as the gain of the target audio device, by identifying and analyzing the panoramic image of the target space, based on the analysis result of the panoramic image and the listening positions of the target space.

In some embodiments, the determining module 920 may determine the parameters of the target audio device based on the image information and the audio information of the target space. For example, the determining module 920 may obtain a plurality of shooting positions based on the video information, and determine the parameters of the target audio device based on the plurality of shooting positions and audio information.

Figure 4:
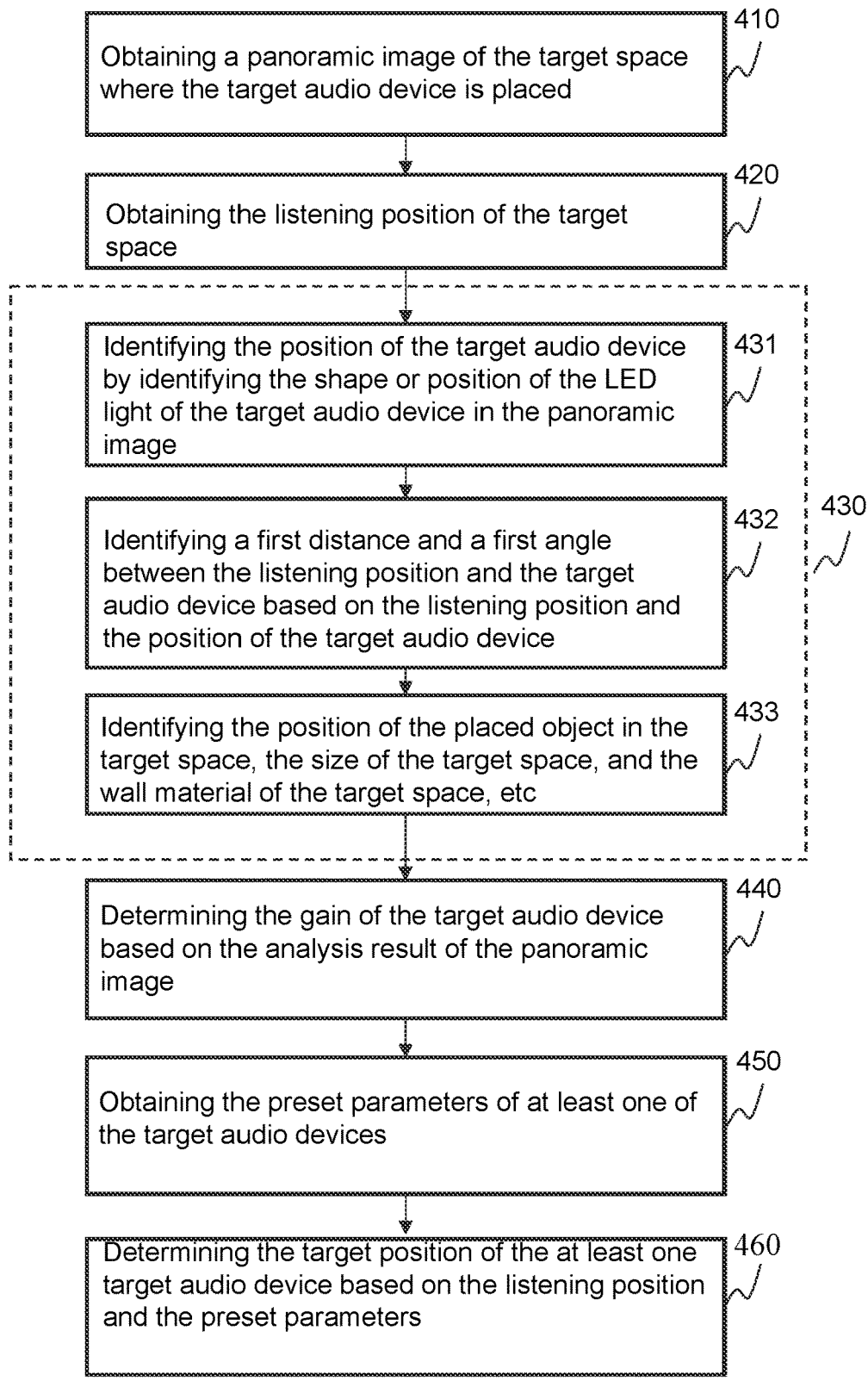
FIG. 4 illustrates an exemplary diagram of a method for determining the parameters of audio device according to other embodiments of the specification.

For the description of determining the parameters of the target audio device, please refer to the related description of FIG. 4.

FIG. 3 illustrates an exemplary diagram of a method for determining the parameters of an audio device according to other embodiments of the specification. In some embodiments, the process 300 may be implemented as a set of instructions (for example, an application) stored in a storage device (for example, the storage device 130). The processing device (for example, the server 110 and/or one or more modules) may execute the instruction set, and when the instruction is executed, the processing device may be configured to perform the process 300. The operation of the illustrated process presented below is for illustration. In some embodiments, the process 300 may be completed with one or more additional operations not described and/or one or more operations not discussed. In addition, the operation sequence of the process 300 shown in FIG. 3 and the content described below do not limit the scope of the application. As shown in FIG. 3, the process 300 may be executed by the processor 120.

In operation 310, the processing device (for example, the obtaining module 910) may obtain the image information of the target space where the target audio device is placed.

The target audio device refers to the audio device of which the parameters are to be determined. In some embodiments, the target audio device may include one or more speakers, or audio equipment arranged in various combinations. In some embodiments, the target audio device may be a combination of one or more speakers in a home theater. For example, the target audio device may include one or more of two front speakers, two rear speakers, one center surround speaker, and one subwoofer speaker. For another example, the target audio device may be a 5.1 surround sound.

The target space refers to the space where the target audio device is placed. For example, the living room of a house, the waiting area of a restaurant, the projection hall of a movie theater, etc.

In some embodiments, the image information may refer to a plurality of images of the aforementioned target space. Among the plurality of images, at least two images may contain one or more of the same elements. For example, at least two of the images may contain the same object or contain a part of the object, and/or the baseline of the same target space, etc.

The panoramic image refers to a wide-angle image in the form of a photo. The panoramic image can display information about the target space and/or objects within. For example, the panoramic image may indicate information such as the position of the target audio device in the target space, the position of other objects in the target space, and the size of the target space, etc. In some embodiments, the processing device (for example, the processor 120) may analyze the above-mentioned information of the panoramic image, and determine the parameters of the target audio device based on the analysis result. For more details on determining the parameters of the target audio device based on the analysis result of the panoramic image, refer to FIG. 4 and its related description.

The obtaining module 910 may obtain images of the target space where the target audio device is placed in a variety of ways. In some embodiments, the obtaining module 910 may obtain an image of the target space where the target audio device is placed from the user device 140 via the network 150. For example, the user device 140 may capture an image through an image obtaining device (for example, a camera), and the image may be provided to the obtaining module 910 in a network transmission manner. In some embodiments, the user may use the user device 140 to take a plurality of images of the target space where the target audio device is placed. Among them, at least two of the plurality of images may contain at least one of the same elements, so that the size of the target space can be calculated based on the plurality of images.

In some embodiments, the obtaining module 910 may obtain an image of the target space where the target audio device is placed from the server 110. For example, the user may upload the captured image to the server 110 for the obtaining module 910 to obtain. In some embodiments, the obtaining module 910 may obtain an image of the target space where the target audio device is placed from the storage device 130. For example, the user may store the captured image in the storage device 130 for the obtaining module 910 to obtain. In some embodiments, the obtaining module 910 may obtain images pre-stored in the storage space of the network 150. For example, the obtaining module 910 may obtain images from the cloud storage space.

In operation 320, the processing device (for example, the first obtaining unit 921) may obtain the listening position of the target space.

The listening position refers to the position where the user listens to the audio played by the target audio device. There may be one or more listening positions. In some embodiments, the listening position may be the real-time position of the user in the target space. The real-time position may be the coordinate position of the user in the space coordinate system at the current moment. For example, the coordinate position of the user in the target space at the first moment is A, and the coordinate position of the user in the target space at the second moment is B, then the real-time position A and real-time position B are both listening positions of the user.

In some embodiments, the listening position may be a common position of the user in the target space. The common position may be a location where the user frequently appears in the target space. Taking the home theater scene as an example, the common position may be the sitting position of the user. Taking the restaurant service scenario as another example, the common position may be the position of the user in the waiting area of the restaurant, or the position of the user in the dining area of the restaurant. It should be noted that the position of an object of the user in the above scene may also be determined as the listening position. For example, determining the coordinate position of a sofa in a home theater, a waiting area of a restaurant, or a chair in a dining area of a restaurant as the listening position to improve the accuracy of determining the listening position.

In some embodiments, the first obtaining unit 921 may obtain the listening position of the target space in a variety of ways. In some embodiments, the processor 120 may obtain the listening position of the target space from an image (for example, a panoramic image) stored in the storage device 130. For example, the processor 120 may determine one or more common positions of the user in the target space from the panoramic image and determine the aforementioned common positions as the listening positions of the target space. For another example, the processor 120 may automatically identify the listening positions by analyzing the layout information of the panoramic image or analyzing the positions of some specific items (for example, a table, a seat, etc.) in the panoramic image. In some embodiments, the obtained listening positions can be adjusted according to the user's common positions. For example, when the obtained listening position is relatively close to the user's common position, the common position may directly be used as the listening position; and when the distance is far, a reminder message may be sent to the user, and the final listening position may be determined based on the user's feedback. Whether the distance is close or far may be determined by comparing a preset distance threshold with the distance between the obtained listening position and the user's common position. For more details about the layout information of the target space, refer to operation 330 and its related description.

In some embodiments, the first obtaining unit 921 may also obtain the listening position of the target space through the user device 140. For example, the first obtaining unit 921 may obtain the real-time position of the user device 140 in the target space from the server 110 via the network 150, and determine the real-time position as the listening position of the target space. For another example, the first obtaining unit 921 may obtain the listening position input by the user, such as inputting in the user device 140 or selecting in the application program interface, from the server 110 via the network 150. Taking a home theater scene as an example, the user may obtain a reminder to take an image through the application of the user device 140, and may take one or more images of the current scene through the camera of the user device 140 and upload them to the application. The user may input or select at least one listening position in the application program according to these images for the first obtaining unit 921 to obtain.

In operation 330, the processing device (for example, the analysis unit 922) may identify the layout information of the target space based on the image information.

The layout information refers to information related to objects placed in the target space. In some embodiments, the layout information may include, but is not limited to, the position of the target audio device, the distance between the listening position and the target audio device, the angle between the listening position and the target audio device, the position of the placed object in the target space, the material of the placed object, the shape of the placed object, the size of the placed object, the size of the target space, the standing wave of the target space, the reverberation of the target space, the sensitivity of the target audio device, and the gain formula of the target audio device, etc.

In some embodiments, the analysis unit 922 may identify the layout information of the target space in a variety of ways. In some embodiments, the analysis unit 922 may identify the layout information of the target space through a machine learning model and/or a combination of related algorithms. Among them, machine learning models may include, but are not limited to, Convolutional Neural Networks (CNN) and Long Short-Term Memory (LSTM) models, etc. The related algorithms may include, but are not limited to, Layout Net, Flat2Layout, E2P, geometric algorithms, and depth information algorithms, etc. For identifying more details on the layout information of the target space, refer to FIG. 4 and its related descriptions.

The position of the target audio device refers to the location of placement of the target audio device in the target space. In some embodiments, the analysis unit 922 may identify the position of the target audio device through image recognition technology. In some embodiments, the analysis unit 922 may extract the feature of the target audio device from the image through a Convolutional Neural Network (CNN), and the position of the feature in the image is the position of the target audio device. For identifying more details on the position of the target audio device, please refer to FIG. 4 and its related description, which will not be repeated here.

In some embodiments, the analysis unit 922 may identify the distance between the listening position and the target audio device in a variety of ways. In some embodiments, the analysis unit 922 can identify the distance between the listening position and the target audio device through image recognition technology. In some embodiments, the analysis unit 922 may extract the features of the target audio device and the listening position from the image through Convolutional Neural Networks (CNN), and determine the baseline between the two based on the above features. In some embodiments, the analysis unit 922 may determine the actual length of the baseline in the real scene based on the scale of the image, and determine the actual length as the distance between the listening position and the target audio device.

In some embodiments, the processing device (for example, the processor 120) may calculate the coordinate difference between the listening position and the target audio device in the target space, in order to obtain the distance between the listening position and the target audio device. For identifying more details on the distance between the listening position and the target audio device, refer to FIG. 4 and its related description.

The placed objects refer to objects placed in the target space, for example, furniture or decorative objects such as sofas, tables and chairs, curtains, and hanging pictures. In some embodiments, the analysis unit 922 may identify the position of the placed object through image recognition technology. In some embodiments, the analysis unit 922 may extract the feature of the placed object from the image through a Convolutional Neural Network (CNN), and the position of the feature in the image is the position of the placed object. In some embodiments, the convolutional neural network can extract features of the placed object through a preset algorithm. For example, Single Shot MultiBox Detector (SSD) algorithm.

The material, shape and size of the placed object may affect the parameters of the target audio device. For example, the placement of sound-absorbing materials may absorb the sound waves of the target audio device, which will reduce the sound quality and volume of the target audio device. For another example, the placed objects with irregular shapes or larger sizes will hinder the transmission of sound waves of the target audio device, thereby weakening the parameters of the audio device such as surround sound effects and stereo effects of the target audio device.

A standing wave refers to a composite wave formed by the interference of two sine waves with the same wavelength, period, frequency, and velocity. The standing waves in the target space will weaken a part of the sound waves emitted by the target audio devices, thereby reducing the user's listening experience. The standing wave of the target space is related to the size of the target space. For example, the larger the size of the target space, the smaller the critical frequency of the standing wave in the target space, and the smaller the influence of the standing wave on the target audio device.

Reverberation refers to an acoustic phenomenon in which the sound continues to exist after the sound source has stopped. The reverberation of the target space will affect the sound quality of the target audio device. The reverberation of the target space is related to the size of the target space and the material of the target space.

The sensitivity of the target audio device refers to the magnitude of the signal voltage at the input end when the sound power amplifier reaches full power output. The higher the signal voltage, the lower the sensitivity. The sensitivity of the audio device is usually used to reflect the subjective sound level of human ears. The higher sensitivity of the audio device, the louder sound the user experiences from the audio device. However, a very high sensitivity will damage the sound quality of the audio device. Therefore, the sensitivity of the audio device should be controlled within a reasonable range to provide users with a high-quality listening experience.

The gain formula of the target audio device refers to the formula used in the process of determining the gain of the target audio device. In some embodiments, the gain formula of the target audio device may be a formula for determining the maximum voltage capacity of the target audio device, wherein the target audio device may be protected by determining the maximum voltage capacity of the target audio device.

In operation 340, the processing device (for example, the first determining unit 923) may determine a parameter of the target audio device based on the layout information, wherein the parameter includes a gain of the target audio device.

The gain of the target audio device refers to the signal amplification rate of the target audio device. For example, the signal amplification rate of a smaller output voltage being amplified by the amplifier to become the larger output voltage.

In some embodiments, the first determining unit 923 may determine a plurality of candidate gains of the target audio device based on the layout information, and determine the gain of the target audio device from the plurality of candidate gains. The gain of the target audio device may provide the target audio device with an improvement of better sound quality at the same volume. In some embodiments, the gain of the target audio device may be determined and adjusted by the corresponding equalizer (EQ).

In some embodiments, the parameters of the target audio device may include, but are not limited to, the gain of the target audio device, the output power of the target audio device, and the delay of the target audio device, etc. In some embodiments, the first determining unit 923 may determine the parameters of the target audio device in a variety of ways. In some embodiments, the first determining unit 923 may determine the parameters of the target audio device based on a machine learning model. In some embodiments, the first determining unit 923 may determine the parameters of the target audio device through the initial parameters of the target audio device. In some embodiments, the initial parameters of the target audio device may include, but are not limited to, one or more of the gain of the target audio device, the output power of the target audio device, and the delay of the target audio device. In some embodiments, the first determining unit 923 may determine the parameters of the target audio device based on the initial parameters of the target audio device and/or the analysis result of the panoramic image.

For more details on determining the parameters of the target audio device, refer to the related descriptions of FIG. 4 and FIG. 6 in the specification.

The layout information of the target space will affect the parameters of the target audio device. For example, if there are a large number of placed objects around the target audio device, the sound wave transmission of the target audio device will be hindered, thereby affecting the user's listening effect. Therefore, identifying the layout information of the target space can help determining the parameters of the target audio device more comprehensively and accurately, so as to provide users with better quality of listening effect.

FIG. 4 illustrates an exemplary diagram of a method for determining the parameters of audio device according to other embodiments of the specification. In some embodiments, the process 400 may be implemented as a set of instructions (for example, an application) stored in a storage device (for example, the storage device 130). The processing device (for example, the server 110 and/or one or more modules) may execute the instruction set, and when the instruction is executed, the processing device may be configured to perform the process 400. The operation of the illustrated process presented below is for illustration. In some embodiments, the process 400 may be completed with one or more additional operations not described and/or one or more operations not discussed. In addition, the operation sequence of the process 400 shown in FIG. 4 and the content described below do not limit the scope of the application. As shown in FIG. 4, the process 400 may be executed by the processor 120.

In operation 410, the processing device (for example, the obtaining module 910) may obtain a panoramic image of the target space where the target audio device is placed.

In some embodiments, the target audio device has one or more LED lights. The LED light may be a function indicator light of the target audio device, and may also be an exterior decorative light of the target audio device.

In some embodiments, the panoramic image is captured when the LED light is on. Since the LED light in the lit state is not affected by the brightness of the target audio space, the panoramic image can therefore have a higher resolution and clearer outline display, therefore helping the processing device (for example, the processor 120) to better identify the position of the target audio device and benefiting the subsequent determination of the parameters of the target audio device to be more comprehensive and accurate. In some embodiments, the panoramic image may also be captured when other lights are on, for example, tungsten filament lights, tungsten halogen lights, fluorescent tubes, and metal halide lights, etc. In some embodiments, the color in the lit state of the lights may affect the resolution of the panoramic image. For example, the resolution of a panoramic image taken when a decorative ambient light is on may be lower than the resolution of a panoramic image taken when a field-lighting light is on. In some embodiments, the power of the light may affect the sharpness of the panoramic image. For example, the sharpness of a panoramic image obtained when a 30 W tungsten light is on is lower than the sharpness of a panoramic image obtained when a 100 W tungsten light is on.

In some embodiments, the obtaining module 910 may obtain a plurality of images of the target space from the mobile terminal. The mobile terminal may be the user device 140. In some embodiments, the mobile terminal may capture a plurality of images of the target space through an image obtaining device (for example, a camera). In some embodiments, a plurality of images may come from different positions in the target space. For example, the user may take a plurality of images containing the same elements of the target space at different positions in the target space, or select one or more images with the best shooting quality among the images taken for the obtaining module 910 to obtain. In some embodiments, a plurality of images may be taken from the same position in the target space. For example, the user may take a plurality of images at the same position in the target space at different angles for the obtaining module 910 to obtain.

In some embodiments, the obtaining module 910 may obtain a plurality of images stored in the mobile terminal from the storage device 130, or from the cloud storage space via the network 150. In some embodiments, the obtaining module 910 may obtain a panoramic image based on the plurality of images. In some embodiments, the obtaining module 910 may obtain the panoramic image of the target space based on arranging and combining the plurality of images in the target space through an image processing device (for example, the processor 120), and stitching together the plurality of images that meet the conditions in the above arrangement and combination. In some embodiments, the obtaining module 910 may continuously capture a plurality of stereo images with a stereo imaging device while the stereo imaging device is rotating in a constant direction, and may combine the plurality of stereo images obtained by the stereo imaging device to obtain a stereo panoramic image.

In some embodiments, the obtaining module 910 may obtain the panoramic image captured or stored by the mobile terminal from the storage device 130 or from the cloud storage space via the network 150.

For more details about obtaining the panoramic image, refer to FIG. 2 and its related description.

In operation 420, the processing device (for example, the first obtaining unit 921) may obtain the listening position of the target space.

In some embodiments, the first obtaining unit 921 may obtain the listening position input by the user from the mobile terminal. In some embodiments, the listening position input by the user to the mobile terminal may include various types. For example, a common position of the user, a selected listening position, or a preferred listening position, etc. In some embodiments, there may be one or more listening positions input by the user to the mobile terminal, which may have one or more types.

In some embodiments, the first obtaining unit 921 may obtain the listening position input by the user from the storage device 130 or from the cloud storage space via the network 150. In some embodiments, the processing device (for example, the processor 120) may record the listening position input by the user into the mobile terminal and store the listening position in the storage device 130 in the form of historical data. The first obtaining unit 921 may obtain the listening position input by the user from the historical data. For more details about obtaining the listening position input by the user from the mobile terminal, refer to FIG. 2 and its related description.

It can be seen from the above description that the first obtaining unit 921 can quickly obtain various types of multiple listening positions input by the user to the mobile terminal without identifying the panoramic image. Therefore, the parameters of the audio device can be determined more comprehensively and accurately based on the above-mentioned listening position, and a better listening experience can be provided.

In operation 430, the processing device (for example, the analysis unit 922) analyzes the panoramic image. In some embodiments, the operation 430 may further include the following operations.

In operation 431, the processing device (for example, the first identifying sub-unit 922-1) may identify the position of the target audio device by identifying the shape or position of the LED light of the target audio device in the panoramic image.

In some embodiments, the processing device may directly determine the position of the target audio device based on a machine learning model. Specifically, the panoramic image is processed through an image identifying model, and the position of the target audio device in the panoramic image is output. The processing device then determines the position of the target image in the target space based on the position of the target audio device in the panoramic image and a mapping relationship. The mapping relationship refers to the mapping relationship between the two-dimensional position coordinates in the panoramic image and the three-dimensional position coordinates in the target space. The image identifying module may be yolo, CNN, etc. The image identifying model may be obtained through training. The training data may include sample panoramic images, and the labels of the training data may be the positions of the sample target audio devices in the sample panoramic images.

The LED lights of the target audio device may help the first identifying sub-unit 922-1 to accurately identify the target audio device from the panoramic image of the target space. In some embodiments, the first identifying sub-unit 922-1 may identify the shape of the LED light of the target audio device. In some embodiments, the first identifying sub-unit 922-1 may identify the shape of the LED light based on preset parameters of the LED light. The preset parameters may include the pattern of the LED light, the size of the LED light, and the color of the LED light, etc. In some embodiments, the processing device (for example, the processor 120) may extract a plurality of features of the LED lights from the panoramic image based on the preset parameters of the LED lights. The first identifying sub-unit 922-1 can identify the shape of the LED light according to the features. In some embodiments, the processing device (for example, the processor 120) may identify the shape of the LED light through a machine learning model based on the panoramic image of the target space. In some embodiments, the first identifying sub-unit 922-1 may identify the position of the LED light of the target audio device. In some embodiments, the processing device (for example, the processor 120) may extract the features of a plurality of LED lights from the panoramic image. The first identifying sub-unit 922-1 may obtain baselines formed by connecting the above-mentioned features, and determine the positions of the LED lights in the panoramic image based on the baselines.

In some embodiments, the first identifying sub-unit 922-1 may identify a second distance between the target audio device and the photographer of the panoramic image by identifying the shape or position of the LED light of the target audio device in the panoramic image. The second distance refers to the relative distance between the photographer and the target audio device. In some embodiments, the processing device (for example, the processor 120) may determine the position of the photographer based on the panoramic image, and determine the baseline formed by connecting the position of the photographer and the position of the LED light. In some embodiments, the first identifying sub-unit 922-1 may determine the length of the second distance based on the baseline in combination with the scale of the panoramic image. For example, if the scale of the panoramic image is 1:20, and the length of the aforementioned baseline is 5 cm, then the length of the second distance is 100 cm.

In some embodiments, the first identifying sub-unit 922-1 may determine the position of the target audio device based on the second distance. For example, suppose that the position coordinate of the photographer is the origin of the coordinates system, and the second distance is 100 cm. In this way, it means that the relative distance between the target audio device and the position of the photographer is 100 cm, and the first identifying sub-unit 922-1 may calculate the coordinate of the target audio device based on the relative distance, and then obtain the position of the target audio device.

Since the shape and size of the LED light are simpler than the shape and size of the target audio device, and according to the foregoing, it can be known that the LED light in the lit state can provide a clearer outline and a higher display resolution in the panoramic image. Therefore, identifying the LED light features can help identifying the position of the target audio device more quickly and accurately, thereby improving the efficiency and accuracy in determining the parameters of the target audio device.

In operation 432, the processing device (for example, the second identifying sub-unit 922-2) may identify a first distance and a first angle between the listening position and the target audio device based on the listening position and the position of the target audio device.

In some embodiments, the second identifying sub-unit 922-2 may determine a baseline connecting the listening position and the position of the target audio device in the panoramic image, and determine the first distance based on the length of the baseline and the scale of the panoramic image. It should be noted that when there are a plurality of target audio devices, the second identifying sub-unit 922-2 may determine a plurality of first distances between the multiple listening positions and the multiple target audio devices based on the baselines connecting the listening positions and the target audio devices in the panoramic image.

For more details about identifying the first distance, refer to the related description of identifying the second distance in operation 431.

In some embodiments, the second identifying sub-unit 922-2 may identify the first angle between the listening position and the target audio device through an off-axis curve. The off-axis curve refers to the frequency response curve when the audio device deviates from the axis. The axis refers to the connecting line between the audio device and the listening position at 0°. The off-axis curve can reflect the quantitative performance of the audio. In some embodiments, the off-axis curve may be preset. Specifically, the off-axis curve can be drawn based on data obtained by pre-measuring the target audio device. For example, the off-axis curve of the audio output within 20-22 kHz can be drawn using the output sound pressure level and frequency as the axis.

It can be understood that the second identifying sub-unit 922-2 may identify the sound pressure level of the target audio device output to the listening position at a specific frequency (for example, 20-22 kHz) first, and then obtain the first angle between the listening position and the target audio device by comparing the output sound pressure level with the preset off-axis curve.

It should be noted that, due to the directivity of the high-frequency signal, when the angle between the target audio device and the listening position is 0° (referred to as on-axis), high-pitched sounds heard by the user is clearer and more accurate relative to other angles (i.e. off-axis). In other words, the greater the off-axis angle, the less the volume of the high-pitched sounds emitted by the audio device. Therefore, an equalizer for off-axis (i.e. off-axis EQ) can be preset accordingly.

In some embodiments, the processing device (for example, the processor 120) may determine the gain of the target audio device through off-axis EQ. Specifically, the off-axis EQ can adjust the high-pitched sounds emitted by the target audio device at different off-axis angles to ensure that the sound quality of the target audio device in the off-axis state is as close as possible to the on-axis state.

In operation 433, the processing device (for example, the third identifying sub-unit 922-3) may identify the position of the placed object in the target space, the size of the target space, and the wall material of the target space, etc.

In some embodiments, the third identifying sub-unit 922-3 may identify the position of the placed object based on the feature of the placed object extracted by the processing device (for example, the processor 120). For more details about identifying the position of the placed object, refer to FIG. 2 and its related description.

In some embodiments, the third identifying sub-unit 922-3 may also identify features such as the material, the shape, and the size of the placed object through preset parameters of the placed object. The preset parameters of the placed object may include material parameters, shape parameters, and size parameters of the placed object, etc. In some embodiments, the processing device (for example, the processor 120) can extract the features of the placed object from the panoramic image, and the third identifying sub-unit 922-3 may compare the features with the preset parameters, and determine the material, shape and size of the placed object based on the comparison results. For example, the third identifying sub-unit 922-3 can compare the features of the placed object and the material parameters of the placed object. If the material parameter is wood and if the comparison result is yes, then it means that the material of the placed object is wood.

In some embodiments, the third identifying sub-unit 922-3 may identify the size of the target space. The size of the target space may be the volume of the target space, or the surface area of all walls and floors in the target space. Specifically, the third identifying sub-unit 922-3 may first identify a plurality of baselines of the panoramic image, and then calculate the actual length of each baseline according to the scale of the panoramic image, and then calculate the size of the target space according to the actual length of each baseline. For more details about the baseline, refer to the related description of the baseline and the target space size below.

In some embodiments, the third identifying sub-unit 922-3 may identify the wall material of the target space. Taking the target space e of a single room as an example, the wall materials of the target space may be the surface materials of six walls in the target space, for example, paint, coating, etc. Specifically, the third identifying sub-unit 922-3 may compare the elements corresponding to the wall material in the panoramic image and the features of the panoramic image, and identify the wall material of the target space according to the obtained comparison results. The features of the panoramic image may be features of wall materials pre-extracted from the panoramic image, for example, pixels and feature vectors of different wall materials, etc.

It should be noted that, both the size of the target space and the wall material of the target space can affect the reverberation of the target space. For more details on the reverberation of the target space, refer to the following embodiments and related descriptions.

By identifying the position, the material, the shape, and the size of placed objects, as well as the size of the target space and the wall material of the target space, multiple influencing factors on the parameters of the target audio device can be assessed, thereby improving comprehensiveness and accuracy of determining the parameters of the audio device.

In some embodiments, analyzing the panoramic image may further include identifying at least one of the size of the target space, the standing wave of the target space, the reverberation of the target space, the sensitivity of the target audio device, or the gain formula of the target audio device, or the like. In some embodiments, these operations may be performed by the third identifying sub-unit 922-3. For example, the placement of sound-absorbing materials can absorb the sound waves of the target audio device, thereby reducing the parameters of the target audio device, such as the sound quality and the volume of the target audio device. For another example, placed objects with irregular shapes or large sizes will hinder the transmission of sound waves of the target audio device, thereby weakening the parameters of the target audio device, such as surround audio effects and stereo effects of the target audio device.

In some embodiments, the third identifying sub-unit 922-3 may identify the size of the target space. In some embodiments, the processing device (for example, the processor 120) may extract a plurality of key points of the target space from the panoramic image of the target space. The key points may be the connection points of the boundary lines between the wall and the ground of the target space. The key points of the target space may also be identified by the image identifying model. The input of the image identifying model is the panoramic image, and the output is the positions of the key points. In some embodiments, the third identifying sub-unit 922-3 may identify the baselines formed by connecting the plurality of key points based on the key points, and calculate the size of the target space based on the lengths of the baselines and the scale of the panoramic image. For example, if the length of one of the plurality of baselines is 20 cm and the scale of the panoramic image is 1:5, then the length of the target space corresponding to the baseline is 100 cm.

In some embodiments, the third identifying sub-unit 922-3 may identify standing waves in the target space. In some embodiments, the third identifying sub-unit 922-3 may identify the standing wave of the target space based on the size of the target space. In some embodiments, the calculation formula of the standing wave frequency can be expressed as:

$$F_1 = \frac{V}{L_1/2}, F_2 = \frac{V}{L_2/2}, F_3 = \frac{V}{L_3/2} \quad (1)$$

Wherein $F_1$ denotes the first-order standing wave frequency in the length direction of the target space, $F_2$ denotes the first-order standing wave frequency in the width direction of the target space, $F_3$ denotes the first-order standing wave frequency in the height direction of the target space, $L_1$ denotes the length of the target space, $L_2$ denotes the width of the target space, $L_3$ denotes the height of the target space, and V denotes the propagation speed of the sound emitted by the audio source in the target space, that is, the speed of sound.

It should be noted that, since the corresponding standing wave frequency needs to be calculated by the speed of sound V in formula (1), $L_1$ in formula (1) needs to be defined as the distance between the audio source and a placed object when the sound of the audio source is completely blocked by the placed object.

The reverberation of the target space can be represented by T60 reverberation. T60 reverberation refers to the time it takes for the sound to decay by 60 dB when the sound stops abruptly after reaching a steady state. In some embodiments, the T60 reverberation measurement formula in the target space can be expressed as:

$$T_{60} = \frac{0.161\, V}{4\,\text{mV} + S\alpha} \quad (2)$$

Wherein V represents the size (volume) of the target space, m represents the air attenuation coefficient, S represents the surface area of the target space, and a represents the average sound absorption coefficient.

In some embodiments, the third identifying sub-unit 922-3 may identify the reverberation of the target space. According to formula (2), the reverberation of the target space is related to information such as the volume, the surface area and the material of the target space. In some embodiments, the processing device (for example, the processor 120) may obtain the size and material of the target space according to the foregoing operations, and the third identifying sub-unit 922-3 may estimate the reverberation of the target space according to the above-mentioned information of the target space, in order to subsequently determine the gain of the target audio device through the bass equalizer.

In some embodiments, the third identifying sub-unit 922-3 may identify the sensitivity of the target audio device. In some embodiments, the third identifying sub-unit 922-3 may identify the sensitivity of the target audio device based on a preset sensitivity parameter. The preset sensitivity parameter may include the maximum voltage capacity and voltage gain of the target audio device. In some embodiments, the processing device (for example, the processor 120) may extract the features of the target audio device, for example, the model of the target audio device. The third identifying sub-unit 922-3 may determine the preset sensitivity parameters of the target audio device based on the features. For example, a preset sensitivity parameter equal or close to the maximum voltage capacity of the model can be selected. In some embodiments, the third identifying sub-unit 922-3 may obtain the sensitivity of the target audio device according to the preset sensitivity parameter based on the sensitivity calculation formula. In some embodiments, the sensitivity calculation formula can be expressed as:

$$V' = \frac{V}{a} \quad (3)$$

Wherein V' represents the sensitivity of the target audio device, V represents the maximum voltage capacity of the target audio device, and a represents the voltage gain. Generally, the sensitivity of the target audio device is between 0.775V and 1.5V.

The gain formula of the target audio device refers to the formula used in the process of determining the gain of the target audio device. In some embodiments, the gain of the target audio device may be a formula of the maximum voltage capacity of the target audio device. The target audio device can be protected by determining the maximum voltage capacity of the target audio device. The maximum voltage capacity of the target audio device can be obtained based on the maximum power and load impedance of the target audio device, and the corresponding gain formula can be expressed as:

$$V = W \times \Omega \quad (4)$$

Wherein V represents the maximum voltage capacity of the target audio device, W represents the maximum power of the target audio device, and $\Omega$ represents the load impedance of the target audio device.

In some embodiments, the third identifying sub-unit 922-3 may identify the gain formula of the target audio device. In some embodiments, the third identifying sub-unit 922-3 may obtain the gain formula of the target audio device from the storage device 130 or from the server 110 via the network 150.

By identifying the above-mentioned various information related to the target space and the target audio device, various influencing factors on the parameters of the target audio device can be assessed, thereby improving comprehensiveness and accuracy of the determination of parameters of the audio devices.

In operation 440, the processing device (for example, the first determining unit 923) may determine the gain of the target audio device based on the analysis result of the panoramic image.

In some embodiments, the parameters of the target audio device may include, but are not limited to, the gain of the target audio device, the output power of the target audio device, and the delay of the target audio device, etc.

In some embodiments, the first determining unit 923 may determine the parameters of the target audio device through a machine learning model. In some embodiments, a plurality of images or the panoramic images of the target space may be input into the machine learning model, and the parameters of the target audio device that are optimized may be output. In some embodiments, the processing device (for example, the processor 120) may obtain the original parameters of the target audio device stored in the storage device 130, evaluate the sound quality of the target audio device under the original parameters through auxiliary equipment or programs (for example, a sound quality evaluation application), and determine the optimized parameters of the target audio device.

In some embodiments, the parameters of the target audio device may be determined based on preset parameters of the target audio device. For more details about determining the parameters of the target audio device based on the preset parameters of the target audio device, refer to FIG. 4 and related descriptions.

In some embodiments, the first determining unit 923 may determine the gain of the target audio device through a machine learning model. In some embodiments, the machine learning model may be a trained audio device parameter configuration model. In some embodiments, the audio device parameter configuration model may include, but is not limited to, a Convolutional Neural Network (CNN), a Long Short-Term Memory (LSTM) model, etc. In some embodiments, the input of the audio device parameter configuration model may be one or more of the following: the position of the target audio device, the first distance and first angle between the listening position and the target audio device, the position of the placed objects, the type of the placed objects, the shape of the placed objects, and the material of the placed objects, etc. The output may be the parameter (for example, gain) of the target audio device. In some embodiments, the input of the audio device parameter configuration model may also be images containing the above-mentioned information. The above-mentioned information of target audio devices may be obtained by a processing device (for example, the processor 120) using an image identifying method.

In some embodiments, the audio device parameter configuration model may be trained based on a plurality of labeled training samples. Specifically, the labeled training samples are input into the audio device parameter configuration model, and the audio device parameter configuration model are updated through training.

In some embodiments, the training samples may include the position of the target audio device, the first distance and first angle between the listening position and the target audio device, the position of the placed objects, the material of the placed objects, the shape of the placed objects, the parameters of the target audio device, the images containing the above information, or a combination thereof.

In some embodiments, training samples may be obtained through auxiliary devices. In some embodiments, the auxiliary devices may be automatic devices, such as robotic arms, automatic carts, etc. In some embodiments, the auxiliary devices may obtain training samples in a plurality of ways. For example, the auxiliary devices may change the position of the target audio devices, the first distance and first angle between the listening position and the target audio device, and the position of the placed objects, by moving the target audio device, the listening device, or the placed objects. For another example, the auxiliary devices may replace the type, shape and/or material of each placed objects. For another example, the auxiliary devices may obtain the parameters of multiple target audio devices by automatically setting or adjusting the parameters of the target audio devices according to the above data. In this way, the auxiliary devices can obtain a large number of training samples through the above operations.

In some embodiments, the labels may be the sound quality of the target audio device or the parameters of the target audio device. In some embodiments, the sound quality of the target audio device may be represented by a corresponding score. The higher the score, the better the sound quality of the target audio device. In some embodiments, the parameters of the target audio device may be a plurality of parameter values of the target audio device that are automatically set. The plurality of parameter values can be automatically set according to the training samples.

In some embodiments, the labels may be obtained by a listening device with a scoring function (for example, a simulated user system). In some embodiments, the listening device can automatically score the sound quality of the target audio device by receiving the sound emitted by the target audio device. In some embodiments, the listening device may filter the above-mentioned labels, and use the sound quality of the target audio device or the parameters of the target audio device that meets preset conditions as the label of the corresponding training samples. In some embodiments, the preset condition may be that the sound quality of the target audio device, or the sound quality corresponding to the parameters of the target audio device, is greater than a preset threshold. In some embodiments, the listening device may obtain the sound quality of the target audio device that meets the preset conditions as a label. For example, if the sound quality of the target audio device obtained by the listening device in the current training sample is 95 points, and the preset threshold is 90 points, then it means that the sound quality of the target audio device meets the preset condition and can be used as a label for the corresponding training sample. In some embodiments, the listening device may obtain the parameters of the target audio device that meets the preset conditions as labels. For example, the auxiliary device may obtain multiple sets of training samples, and automatically set different sets of parameters of the target audio device for each set of training samples. The listening device obtains the sound quality score of the target audio device under each different sets of parameters mentioned above, and the set of parameters of the target audio device with a sound quality score exceeding the preset threshold is used as the label for the corresponding training sample.

In some embodiments, the audio device parameter configuration model may be trained based on the foregoing samples through various methods to update the model parameters. For example, training can be performed based on the gradient descent method.

In some embodiments, the training ends when the trained audio device parameter configuration model meets a preset condition. The preset condition may be that the result of the loss function converges or is less than a preset threshold.

According to the above description, when determining the parameters of the target audio device, considering the position of the target audio device, the first distance and first angle between the listening position and the target audio device, the position of the placed objects, the size of the target space, and the wall materials of the target space, etc. can improve the accuracy and comprehensiveness of the target audio device parameter determination, and enhance the user's listening experience.

In some embodiments, the determining module 920 may determine the output power of the target audio device and/or the delay of the target audio device based on the analysis result of the panoramic image.

The output power of the target audio device refers to the rated power of the target audio device in use. The output power of the target audio device can determine the maximum sound intensity of the target audio device. In some embodiments, the determining module 920 may determine the output power of the target audio device based on the analysis result of the panoramic image. In some embodiments, the analysis result of the panoramic image may include the size of the target space. The determining module 920 may determine the optimal output power of the target audio device based on the size of the target space using the gain formula of the target audio device. In some embodiments, the gain formula of the target audio device may be an optimal correspondence relationship between the volume of the target space and the output power of the target audio device. For example, when the volume of the target space is 20 m³, the determining module 920 may determine the optimal output power of the target audio device as 60 W according to the optimal correspondence relationship.

The delay of the target audio device refers to the delay for the user to receive the sound emitted by each audio device. Proper delay can improve the stereo sound quality of the target audio device. For example, when the delay of two audio sources is between 5 ms to 35 ms, the human ear can only perceive the existence of the one audio source ahead; when the delay of the audio sources is between 30 ms to 50 ms, the human ear can roughly distinguish the two audio sources; when the delay of the audio sources is greater than 50 ms, the human ear can tell the presence of two audio sources. The smaller the delay of the target audio device, the softer the sound quality of the target audio device; the greater the delay of the target audio device, the stronger the stereo surround sound of the target audio device. In some embodiments, the determining module 920 may determine the delay of the target audio device according to the listening effect required by the user. For example, when the user requires sound quality with a strong stereo surround sound, the determining module 920 may determine a larger delay of the target audio device within a reasonable range.

By determining the output power of the target audio device and the delay of the target audio device, the parameters of the target audio device can be adjusted more reasonably, thereby improving the comprehensiveness of audio parameter determination and enhancing the user's listening experience.

In some embodiments, the determining module 920 may determine the gain of the target audio device based on the first distance or the second distance. Taking the first distance between a listening position and a 5.1 surround sound as an example, the first distances from the user's listening position to five audio devices of the 5.1 surround sound are $a_1$, $a_2$, $a_3$, $a_4$ and $a_5$, respectively. In some embodiments, the average value of the above first distance can be expressed as:

$$a_{ve} = \frac{a_1 + a_2 + a_3 + a_4 + a_5}{5} \tag{5}$$

In some embodiments, the gain of the above five audio devices can be expressed as:

$$A = 20^* \log\left(\frac{a}{a_{ve}}\right) \tag{6}$$

Wherein a can be any one of $a_1$ to $a_5$.

In some embodiments, the above-mentioned gain may be adjusted by an equalizer or a dynamic equalizer of the target audio device to determine the parameters of the target audio device.

In operation 450, the processing device (for example, the second obtaining unit 924) may obtain the preset parameters of at least one of the target audio devices.

The preset parameters refer to parameters of the target audio device that are preset. In some embodiments, the preset parameters may be the optimal parameters of audio device. For example, the delay of the target audio device may be between 5 ms and 50 ms. If the sound quality of the target audio device is made to have a strong stereo surround feeling, the optimal delay of the target audio device may be between 30 ms and 50 ms. In some embodiments, the preset parameters may be the boundary of the adjustable range of the parameters of the target audio device. For example, when the adjustable range of the delay of the target audio device is between 30 ms and 50 ms, the preset delay of the target audio device may be 30 ms or 50 ms.

In some embodiments, the second obtaining unit 924 may obtain the preset parameters of the target space from the storage device 130 or from the cloud storage space through the network 150. In some embodiments, the second obtaining unit 924 may obtain the preset parameters input by the user manually from the user device 140.

In some embodiments, the preset parameters may include a preset gain of at least one of the target audio devices. For example, the sensitivity gain of the target audio device, the output power gain of the target audio device, or the likes.

In operation 460, the processing device (for example, the second determining unit 925) may determine the target position of the at least one target audio device based on the listening position and the preset parameters.

In some embodiments, the preset parameters may be the delay of the target audio device. In some embodiments, the processing device (for example, the processor 120) may obtain the delay of the target audio device at a certain listening position, and the second determining unit 925 may determine the target position or a range of possible target positions of the at least one target audio device based on the delay of the target audio device. For example, when the delay of a target audio device is greater than 50 ms, it means that the delay of this target audio device is too large, which will produce an echo effect that affects the sound quality of the target audio device. The second determining unit 925 may then reduce the distance between this target audio device and other audio devices to reduce the overall delay of this target audio device.

In some embodiments, the preset parameters may be the gain of the target audio device. In some embodiments, the processing device (for example, the processor 120) may obtain the gain of the target audio device at a certain listening position, and the second determining unit 925 may determine the target position or a range of possible target positions of the at least one target audio device based on the gain of the target audio device. For example, when the gain of the target audio device is a thousand times amplification gain of the output voltage of the target audio device through three 20 db amplifiers, the user can evaluate the sound quality of the target audio device through auxiliary devices or systems (for example, an sound quality evaluation application). The determining unit 925 may increase the distance between the at least one target audio device and other audio devices to further increase the surround sound quality of the target audio device.

It can be seen from the above description that, when the parameters of the target audio device reach their relatively optimized values, their optimal values or the boundary values of the adjustable range, the user's listening experience can be further improved by changing the position of the target audio device, thereby improving the accuracy and variety of the audio parameters determination.

Figure 5:
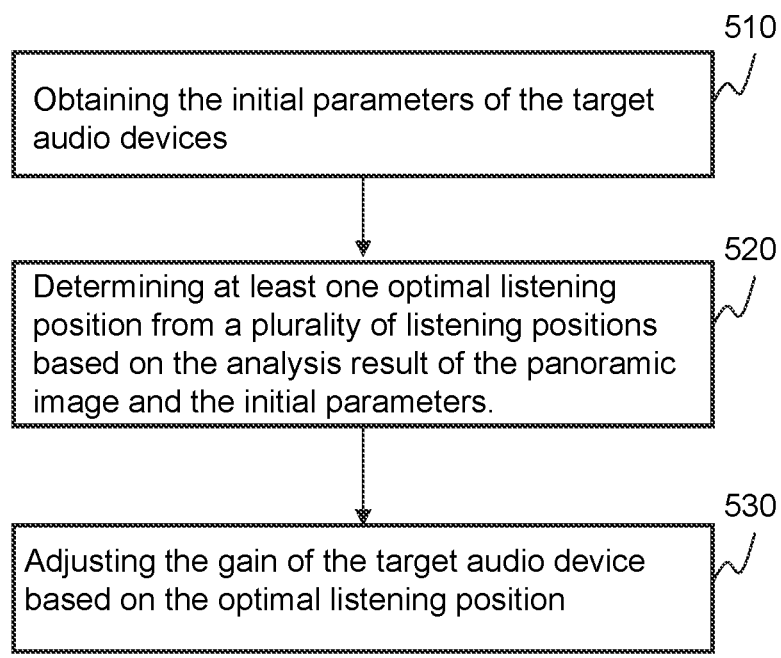
FIG. 5 illustrates an exemplary diagram of determining a gain of the target audio device according to some embodiments of the specification.

FIG. 5 illustrates an exemplary diagram of determining a gain of the target audio device according to some embodiments of the specification. In some embodiments, the process 500 may be implemented as a set of instructions (for example, an application) stored in a storage device (for example, the storage device 130). The processing device (for example, the server 110 and/or one or more modules) may execute the instruction set, and when the instruction is executed, the processing device may be configured to perform the process 500. The operation of the illustrated process presented below is for illustration. In some embodiments, the process 500 may be completed with one or more additional operations not described and/or one or more operations not discussed. In addition, the operation sequence of the process 500 shown in FIG. 5 and the content described below do not limit the scope of the application. As shown in FIG. 5, the process 500 may be executed by the processor 120.

In operation 510, the processing device (for example, the first determining unit 923) may obtain the initial parameters of the target audio devices.

The initial parameters may be the default parameters of the target audio devices. In some embodiments, the initial parameters can be set based on experience. In some embodiments, the initial parameters may include the initial parameters of the target audio device, such as the initial gain of the target audio device, the initial output power of the target audio device, and the initial delay of the target audio device, etc.

In some embodiments, the processor 120 may obtain the initial parameters from the storage device 130 or the user device 140.

In operation 520, the processing device (for example, the first determining unit 923) may determine at least one optimal listening position from a plurality of listening positions based on the analysis result of the panoramic image and the initial parameters.

In some embodiments, the analysis result of the panoramic image may include the position of the target audio device and the listening position. In some embodiments, the processing device (for example, the processor 120) may obtain multiple parameters of target audio devices corresponding to multiple listening positions, and determine at least one optimal listening position based on the comparison result of multiple parameters of the target audio devices and the multiple initial parameters. For example, if the initial parameter is the delay of the target audio device, and the delay of the target audio device corresponding to a first listening position is 40 ms while the delay of the target audio device corresponding to a second listening position is 60 ms, then the comparison result is the first listening position is better than the second listening position. Repeat the above operations until at least one optimal listening position is determined.

In operation 530, the processing device (for example, the first determining unit 923) may adjust the gain of the target audio device based on the optimal listening position.

In some embodiments, the processing device (for example, the processor 120) may adjust the gain of the target audio device based on the optimal listening position. For example, if the listening effect required by the user is soft sound quality, the processor 120 may reduce the gain of the target audio device, for example, by reducing the amplifier multiple of the target audio device.

It can be seen from the above description that, the optimal parameters of audio devices can be further determined at the optimal listening position, thereby improving the comprehensiveness and accuracy of the audio parameters determination and enhancing the user's listening experience.

The beneficial effects that some embodiments of the specification may bring include, but are not limited to: (1) by identifying the panoramic image of the target space where the target audio device is located, multiple factors that affect the parameters of the target audio device are obtained, and the determination of the parameters of the target audio device can be more convenient, faster, more comprehensive, and more accurate; (2) by changing the position of the target audio device, the gain of the target audio device can be further determined at the optimal parameters of the target audio device or at the optimal listening position, thereby improving the user's listening experience. It should be noted that, different embodiments may have different possible beneficial effects. In different embodiments, the possible beneficial effects may be any one or a combination of the above, or any other possible beneficial effects.

FIG. 6 illustrates an exemplary diagram of a method for determining the parameters of audio device according to other embodiments of the specification. In some embodiments, the process 600 may be implemented as a set of instructions (for example, an application) stored in a storage device (for example, the storage device 130). The processing device (for example, the server 110 and/or one or more modules) may execute the instruction set, and when the instruction is executed, the processing device may be configured to perform the process 600. The operation of the illustrated process presented below is for illustration. In some embodiments, the process 600 may be completed with one or more additional operations not described and/or one or more operations not discussed. In addition, the operation sequence of the process 600 shown in FIG. 6 and the content described below do not limit the scope of the application.

In operation 610, the processing device (for example, the obtaining module 910) may obtain a video information and an audio information of the target space where the target audio device is placed through the camera and microphone of the user device 140.

The target audio device refers to the audio device whose parameters are to be determined. In some embodiments, the target audio device may include one or more audio devices, or audio device arranged in various combinations. For example, the target audio device may include one or more of front audio devices, rear audio devices, center surround audio devices, and subwoofer audio devices. For another example, the target audio device may include audio devices and sound signal processing device (for example, effectors, mixers, equalizers, etc.). In some embodiments, the target audio device can be used in various audio-visual spaces, such as, home theaters, professional audio-visual rooms, etc.

The target space refers to the audio-visual space where the scene where the target audio device is placed. For example, the living room of a house, the waiting area of a restaurant, the projection hall of a movie theater, etc.

The video information of the target space refers to the video information captured in the target space, and the video information may display the information of the target space and/or objects therein. For example, the video information may reflect information such as the position of the user device 140, the positions of target audio devices in the target space, the positions of other placed objects in the target space, and the size of the target space, etc. In some embodiments, the video information may have preset requirements, such as including an audio device. In some embodiments, the video corresponding to the video information can be captured under the guidance of the user device 140. In some embodiments, the video may be a piece of continuously captured video, or may be formed by stitching multiple pieces of video together.

The audio information of the target space refers to audio recorded in the target space, and the audio can record the sound signal of sound played by the target audio device. For example, the audio may reflect information such as the relative position of the user device 140 to the target audio device, the volume of the target audio device, and the sound quality of the target audio device, etc. The audio and the video may have a corresponding relationship. In some embodiments, the sound played by the target audio device may be music input by the user, or may be a test sound dedicated for testing. In some embodiments, the audio may come from one or more target audio devices. If the audio comes from multiple target audio devices, the audio may be played by multiple audio devices at the same time and/or by each of the multiple audio devices separately.

In operation 620, the processing device (for example, the first obtaining unit 921) may obtain a plurality of shooting positions according to the video information.

The shooting position refers to the position information of the user device 140 in the target space when the user device 140 inputs video information and/or audio information, such as orientation, direction, etc. Each shooting position corresponds to an image frame of the video and/or a set of audio data in the audio. In some embodiments, the shooting position may be represented by a coordinate position in a spatial coordinate system of the target space, and the spatial coordinate system may be two-dimensional or three-dimensional. For example, in a space coordinate system constructed based on a target space of 10×10×10 meters with the southwest corner as the origin (0,0,0), the shooting position of the user device 140 in the center of the space coordinate system of the target space and held by a user in front of his/her chest may be (5, 5, 1.5). In some embodiments, the shooting position may be the relative position of the user device 140 to the position of the target audio device. For example, if the target audio device A is in the target space and the position is known, a shooting position may be "20 degrees southwest of the target audio device A, and 3 meters away from the target audio device A". The shooting position may also use other placed objects as reference objects to determine the relative position of the user device 140. For example, the reference object may be an object whose position in the target space does not change.

In some embodiments, the obtaining a plurality of shooting positions according to video information includes: extracting a plurality of image frames from the video information according to a preset time interval, wherein two adjacent image frames in the plurality of image frames have an overlapping part; and determining a plurality of shooting positions based on the plurality of image frames.

The preset time interval refers to the interval time for extracting image frames, such as 2 seconds, 1 second, etc. The preset time interval may be set according to actual needs. In some embodiments, the preset time interval may be changed according to the extracted image frames. For example, when two adjacent image frames in the plurality of image frames have no overlapping part, the preset time interval is shortened, and image are continued to be extracted based on the shortened preset time interval until the two image frames have an overlapping part.

A plurality of image frames refer to a part or all of the image frames constituting the video information. Each image frame of the plurality of image frames corresponds to a shooting position.

The two adjacent image frames in the plurality of image frames having an overlapping part refers to two adjacent image frames in the plurality of image frames that contain at least one identical and identifiable object, such as audio devices, furniture, decorations, etc. The two adjacent image frames in the plurality of image frames having an overlapping part may help to track the relative change between the two shooting positions corresponding to the two adjacent image frames. For example, an image frame A corresponds to a shooting position a, and the next image frame B corresponds to a shooting position b. Both image frames include an audio device C and the audio device position c is known. Then, the position information ac of the shooting position a relative to the audio device position c can be obtained through the image frame A, and the position information bc of the shooting position b relative to the audio device position b can be obtained through the image frame B. Finally, the position change of the shooting position b relative to the shooting position a can be obtained based on the position information ac and the position information bc.

In some embodiments, the user device 140 may guide the user to move during shooting. In some embodiments, the way of guidance may be voice prompts, text prompts, and/or screen icon prompts. In some embodiments, the guidance may be generated and/or changed according to information received by the user device 140. For example, the way of guidance and the content of the guidance may be generated and/or changed based on the information such as, position information, sound information, and visual information, etc. received by the user device 140. Exemplarily, according to the position information received by the user device 140, if it is determined that the relative distance between the user device 140 and the audio device is increasing, the content of the guidance (for example, the moving direction) corresponding to the user device 140 can adjust accordingly to shorten the relative distance between the user device 140 and the audio device to ensure the accuracy of the guidance. In some embodiments, the guidance may also be a simple and broad prompt, such as "move to the first audio device". In some embodiments, when two adjacent image frames in the plurality of image frames have no overlapping part due to moving too fast or other reasons, the user device 140 may guide the user to return to the previous position and move again as required. In some embodiments, the user device 140 may guide the user to move to one or more positions of audio devices according to the volume of the sound emitted by the audio devices and the origins of the sound, and may also guide the user to move to a designated position according to the position information. The guidance may be obtained through shooting positions based on a plurality of image frames or other methods, and/or achieved as reminders through vibration or other methods. For the related content of obtaining the shooting position based on the plurality of image frames, refer to FIG. 7.

In some embodiments, the obtaining a plurality of shooting positions based on the video information further includes: obtaining a plurality of shooting positions based on the video information and a motion sensor of the user device 140. For example, during a video capturing process, the user device 140 may first direct the user to move to a reference position (for example, the position of an audio device), and then obtain a plurality of shooting positions based on the motion sensor by obtaining the displacements of the user device 140 relative to the reference position. In some embodiments, the user device 140 may determine whether the user has reached the position of the audio device and/or guide the user to approach the position of the audio device based on the received audio information, for example, based on the volume, the sound direction, etc.

In some embodiments, the processing device may obtain a plurality of shooting positions based on the motion sensor. The plurality of shooting positions refers to audio recording positions. For example, the user device 140 may first direct the user to move to a reference position (for example, the position of an audio device), and then obtain a plurality of shooting positions by using the motion sensor to detect the displacements of the user device 140 relative to the reference position. In some embodiments, the user device 140 may direct the user's movement through voice. In some embodiments, the user device 140 may set the position where the motion sensor and/or the microphone are activated as the reference position. For example, the reference position may be a position where the user device 140 is placed within 0.1 meter directly in front of the audio device when the user activates the motion sensor and/or the microphone.

A motion sensor refers to a module in the user device 140 that can obtain displacement information. In some embodiments, the displacement information may include distance, direction, etc. In some embodiments, the calculation method of the displacement information may be based on the detected acceleration and/or angular velocity.

In some embodiments, the processing device may obtain a more accurate result by combining the shooting positions obtained based on the motion sensor and the shooting positions obtained based on the image frames. In some embodiments, the way of combining may be arithmetic average, weighted average, etc. For example, if a shooting position obtained based on the motion sensor is the true north of the audio device and 1 meter away from the audio device, and a shooting position obtained based on the image frames is the true north of the audio device and 1.1 meters away from the audio device, then the output shooting position can be obtained based on the arithmetic average, which is true north of the audio device and 1.05 meters away from the audio device. For another example, if the user device 140 determines that the motion sensor of the user equipment 140 is more accurate than its camera in the ability of determining the shooting position based on historical data, user device 140 parameters and/or other information, then a higher weight can be given to the motion sensor, such as 0.8, and therefore the output shooting position is true north of the audio device and 1.02 meters away from the audio device by using the weighted average method and based on the example above. In some embodiments, the way of combining may use other algorithms.

In some embodiments, combining the shooting positions obtained based on the motion sensor and the shooting positions obtained based on the image frames to determine the final shooting position may be implemented by a machine learning model. For a more detailed explanation of determining the final shooting position, refer to FIG. 3 and its related description.

Using the motion sensor to obtain the shooting position provides new perspectives in addition to using the video to obtain the shooting position, which improves the accuracy of the result and is also suitable for when video is not ideal (e.g. when video is too blurry due to the environment being too dark, the camera being not clear, or the camera lens being damaged), thereby providing an additional solution for obtaining the shooting position.

In operation 630, the processing device (for example, the first determining unit 923) may determine the parameters of the target audio device based on a plurality of shooting positions and the audio information.

In some embodiments, the processing device may analyze a plurality of shooting positions and their corresponding image frames and corresponding sets of audio data, identify the layout information of the target space, and determine the parameters of target audio device based on the layout information.

The layout information refers to information related to objects placed in the target space. In some embodiments, the layout information may include, but is not limited to, the position of the target audio device, the distance between the listening position and the target audio device, the angle between the listening position and the target audio device, the position of the placed object in the target space, the material of the placed object, the shape of the placed object, the size of the placed object, the size of the target space, the standing wave of the target space, the reverberation of the target space, the sensitivity of the target audio device, and the gain formula of the target audio device, etc. For more details of the layout information, see FIG. 3 and it related descriptions.

In some embodiments, the processing device may identify the distance between the shooting position and the target audio device in a variety of ways. In some embodiments, the processing device can identify the distance between the shooting position and the target audio device through image identifying technology. In some embodiments, the processing device may extract the features of the target audio device and the shooting positions from the image frames through Convolutional Neural Networks (CNN), and determine the baseline between the two based on the above features. In some embodiments, the processing device may determine the actual length of the baseline in the real scene based on the scale of the image, and determine the actual length as the distance between the shooting position and the target audio device. In some embodiments, the distance between the shooting position and the target audio device may also be determined by calculating the difference between their corresponding coordinates in the target space.

In some embodiments, the parameters of the target audio device may be determined in a variety of ways. In some embodiments, the parameters of the target audio device may be determined based on a machine learning model. The machine learning model may include, but are not limited to, Convolutional Neural Networks (CNN) and Long Short-Term Memory (LSTM) models, etc. In some embodiments, the parameters of the target audio device may be determined based on the initial parameters of the target audio device. In some embodiments, the initial parameters of the target audio device may include, but are not limited to, one or more of the gain of the target audio device, the output power of the target audio device, and the delay of the target audio device. In some embodiments, the parameters of the target audio device may be determined based on the initial parameters and/or the analysis result of the video information. In some embodiments, a plurality of images or the panoramic images of the target space may be input into the machine learning model, and the parameters of the target audio device that are optimized may be output. In some embodiments, the processing device may obtain the original parameters of the target audio device stored in the storage device 130, evaluate the sound quality of the target audio device under the original parameters through auxiliary equipment or programs (for example, a sound quality evaluation application), and determine the optimized parameters of the target audio device.

Through the video and audio captured by the user device 140, the user can determine the parameters of the target audio device more conveniently, making the professional parameter adjustment smarter and simpler, and providing users with better listening effects.

Figure 7:
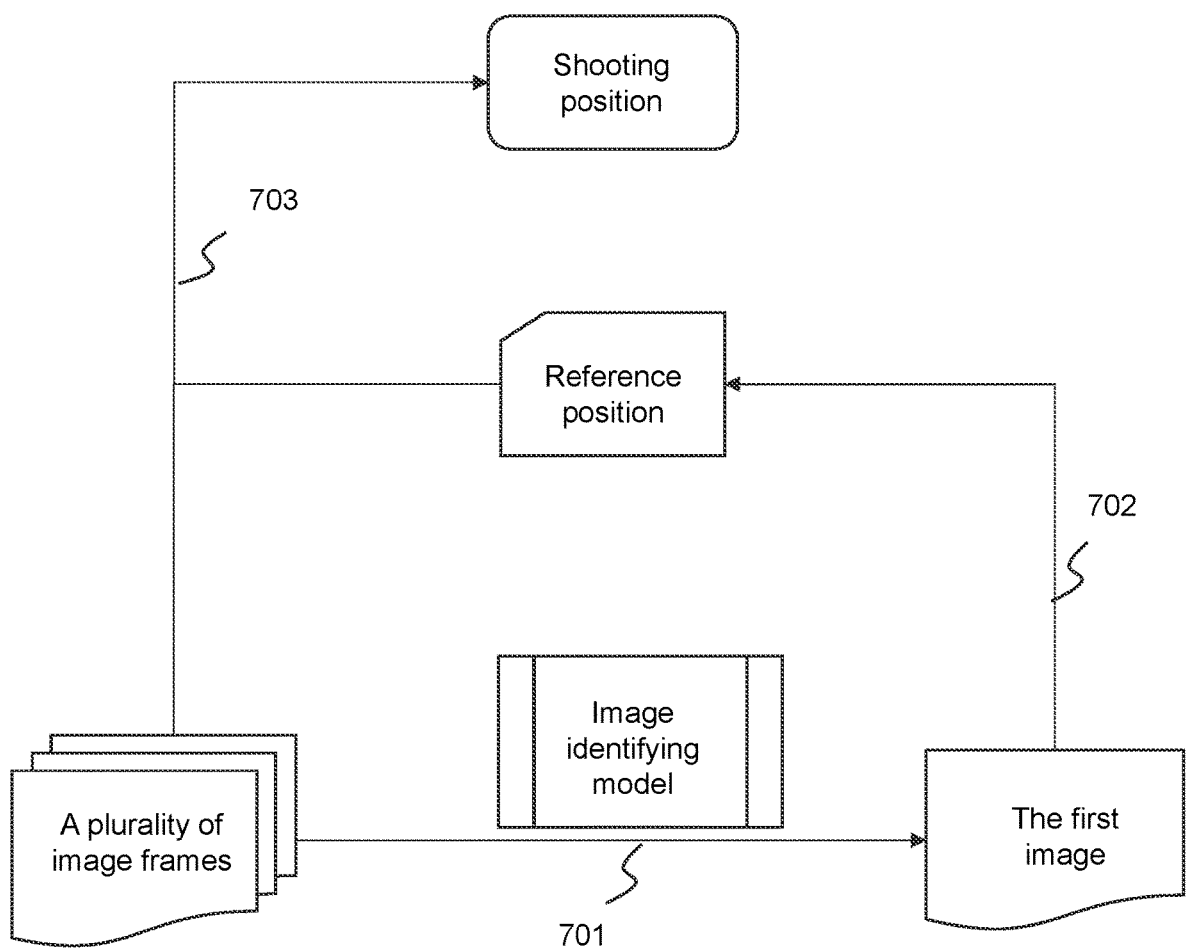
FIG. 7 illustrates an exemplary diagram of determining a plurality of shooting positions according to some embodiments of the specification.

FIG. 7 illustrates an exemplary diagram of determining a plurality of shooting positions according to some embodiments of the specification. In some embodiments, the process 700 may be implemented as a set of instructions (for example, an application) stored in a storage device (for example, the storage device 130). The processing device (for example, the server 110 and/or one or more modules) may execute the instruction set, and when the instruction is executed, the processing device may be configured to perform the process 700. The operation of the illustrated process presented below is for illustration. In some embodiments, the process 700 may be completed with one or more additional operations not described and/or one or more operations not discussed. In addition, the operation sequence of the process 700 shown in FIG. 7 and the content described below do not limit the scope of the application.

In operation 701, the processing device (for example, the first obtaining unit 921) may determine a first image in the plurality of image frames through an image identifying model, wherein the first image includes a target audio device.

An image identifying model refers to any model that has a function of identifying objects in an image. In some embodiments, the image identifying model may be a machine learning model. In some embodiments, the image identifying model may include, but is not limited to, a convolutional neural network, a long and short-term memory model, etc. In some embodiments, the input of the image identifying model may be the plurality of image frames, and the output may be one or more image frames including the target audio device in the plurality of image frames, that is, the first image.

In operation 702, the processing device (for example, the first obtaining unit 921) may determine a reference position based on the first image.

The reference position refers to a benchmark position that has a guiding effect on the shooting position. For example, the shooting position may be described as a relative position from the reference position. In some embodiments, the reference position may be the position of the target audio device in the target space. The position of the target audio device in the target space may be determined according to the first image containing the target audio device. For example, the position of the target audio device in the target space may be determined based on the distance and the angle of the target audio device relative to the camera in the first image. In some embodiments, the reference position may also be the position of any placed objects, such as the position of furniture, decorations, etc. in the target space. In some embodiments, the reference position may also be a preset known position.

In operation 703, the processing device (for example, the first obtaining unit 921) may determine a plurality of shooting positions based on the reference position and the plurality of image frames.

In some embodiments, the processing device may determine the shooting positions of the image frames containing the reference object based on the reference position, and determine the shooting positions of two adjacent image frames having an overlapping part in the plurality of image frames. In some embodiments, the overlapping part of the two adjacent image frames in the plurality of image frames may be used to determine the change of angle and distance between the two corresponding shooting positions. For example, let there be three image frames A, B, and C. Image A contains an audio device and a sofa, which is set to be the first image and corresponds to shooting position a; Image B contains the sofa and a wall painting, which corresponds to shooting position b; Image C contains only the wall painting, which corresponds to shooting position c. If the audio device is set as the reference object, then the position of the audio device (i.e. the reference position), as well as the shooting position a relative to the position of the audio device, can be determined according to the distance and angle of the audio device from the camera in image A. For example, the shooting position a can be true north of the position of audio device, which is 1 meter away from the audio device. Image B and Image A contain the overlapping part of the sofa. The shooting position b relative to the shooting position a and/or the position of the audio device can be determined based on the changes in the angle and distance of the sofa in the two images. For example, the shooting position a may be 1 meter north of the audio device. Then, since image A and image B have an overlapping part of the sofa, the shooting position a and/or the shooting position b can be determined according to the change of angle and distance of the sofa in the two images. For example, if the shooting position b is south of the shooting position a and is 2 meters away from the shooting position a, then the shooting position b may be described as 1 meter south of the position of the audio device. Similarly, since image C and image B contain the overlapping part of the wall painting, the shooting position b and/or the shooting position c can be determined according to the change of angle and distance of the wall painting in the two images. For example, according to the change of the wall painting, it is determined that the shooting position c is west of the shooting position b and is 1 meter away from the shooting position b, then the shooting position c can be described as 1.41 meters south west of the position of the audio device.

Determining a plurality of shooting positions based on the image identifying model, the reference position, and overlapping parts can quickly and conveniently establish the relative positional relationship between every two adjacent shooting positions without consuming additional computing power to get the absolute position of each shooting position, thus improving efficiency.

Figure 8:
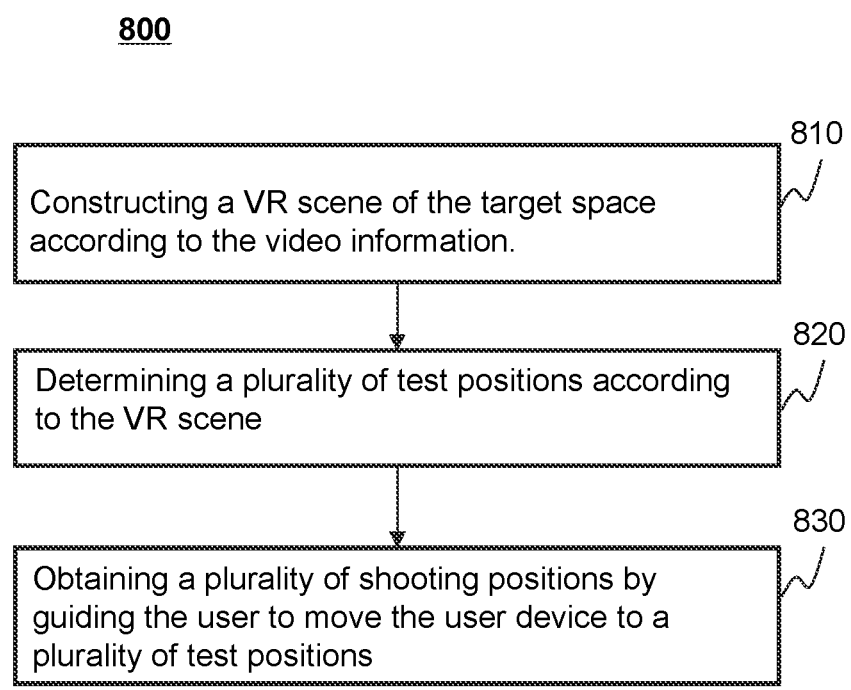
FIG. 8 illustrates an exemplary diagram of a method for determining the parameters of audio device according to other embodiments of the specification.

FIG. 8 illustrates an exemplary diagram of a method for determining the parameters of target audio devices according to other embodiments of the specification. In some embodiments, the process 800 may be implemented as a set of instructions (for example, an application) stored in a storage device (for example, the storage device 130). The processing device (for example, the server 110 and/or one or more modules) may execute the instruction set, and when the instruction is executed, the processing device may be configured to perform the process 800. The operation of the illustrated process presented below is for illustration. In some embodiments, the process 800 may be completed with one or more additional operations not described and/or one or more operations not discussed. In addition, the operation sequence of the process 800 shown in FIG. 8 and the content described below do not limit the scope of the application. As shown in FIG. 8, the process 800 may be executed by the processor 120.

As shown in FIG. 8, the process 800 includes the following operations. In some embodiments, the process 800 may be performed by the first determining unit 923.

In operation 810, the processing device (for example, the first determining unit 923) may construct a VR scene of the target space according to the video information.

A VR scene refers to a scene in which real objects are three-dimensionally reconstructed after real scene video/image shooting and image processing. For example, the VR scene of the target space may be a scene constructed after image processing and image stitching based on the video information of the target space. In some embodiments, VR scene production may include real scene video/image shooting, image processing, and image stitching. Equipment used for scene shooting includes Digital Single Lens Reflexes, panoramic heads, fisheye lenses, tripods, and/or aircraft, etc. The image stitching and image processing can be carried out in various feasible ways.

In operation 820, the processing device (for example, the first determining unit 923) may determine a plurality of test positions according to the VR scene.

The test position refers to a position to listen to the target audio device that is obtained by calculation or other methods. In some embodiments, the test position may be the theoretically best position for listening to the target audio device. In some embodiments, the test position may also be a sample sound collection position that optimizes the ability to adjust the parameters of audio device. For example, in a target space with very complicated shapes and materials, calculations may not be able to achieve sufficient confidence, thus users can collect sound samples at specific test positions to supplement and verify the results of the calculations, so as to maximize the optimization of the parameter adjustment ability of the audio device.

In some embodiments, a plurality of test positions can be calculated based on the VR scene, the position of the target audio device, and/or the layout information. In some embodiments, the position of the target audio device and/or the layout information may be obtained through the method shown in FIG. 2 and its related description, or may be obtained through other channels.

In some embodiments, the user may input candidate test positions into the VR scene. For example, the user can input the position of a commonly used sofa into the VR scene as a candidate test position. In some embodiments, the candidate test positions may be used as references for calculation of the test positions. For example, when a plurality of similar test positions are calculated, the test positions that are closer to the candidate test positions can be prioritized. In some embodiments, the candidate test positions may be directly used as the test positions.

In operation 830, the processing device (for example, the first determining unit 923) may obtain a plurality of shooting positions by guiding the user to move the user device 140 to a plurality of test positions.

The process in which the user uses the user device 140 to perform video shooting and/or audio recording at the plurality of test positions is a process of converting the plurality of test positions into the plurality of shooting positions. In some embodiments, the plurality of calculated test positions may be displayed through a VR scene, and/or the user may be guided to move the user device 140 to the test positions through the VR scene.

In some embodiments, the processing device may transmit the model of the real scene inside the audio-visual space constructed by the VR scene to the cloud system, and the cloud system can then calculate the optimized parameters of the target audio device based on the real scene model.

In some embodiments, electromagnetic sensors or other sensing devices can be arranged inside the audio device combination to realize that the audio device combination can perceive the relative parameters such as the distance and orientation between each other. When testing audio device, related parameters such as the distance and azimuth can be transmitted to the terminal equipment, and prompt information is displayed on the terminal equipment to remind the personnel involved in debugging how to adjust the relative position of the audio device. Exemplarily, a certain audio device combination includes the front audio device M and the rear audio device N. During the audio device debugging, the front audio device M and the rear audio device N are turned on at the same time, and the mobile terminal is connected to the audio device combination (for example, WiFi or Bluetooth connection, etc.). The debugging parameters and debugging guidance between the aforementioned audio device combinations can be obtained. For example, it is suggested that the relative distance between the front audio device M and the rear audio device N can be reduced by 10 cm to achieve the best listening effect.

In some embodiments, the audio device can be equipped with distance sensors, automatic obstacle avoidance devices, sound sensors, and other intelligent adjustment devices. The audio device can realize intelligent adaptive adjustment, and achieve the best sound effect without manual based on automatically adjusting the relative position and/or complete parameter settings by itself intervention. For example, during audio device debugging, turn on the front audio device M and the rear audio device N at the same time, set the position of one of the audio device s to a fixed or select a fixed reference object, the front audio device M and the rear audio device N can be automatically sense and complete relative position and parameter adjustment to achieve the ideal listening effect.

Figure 9:
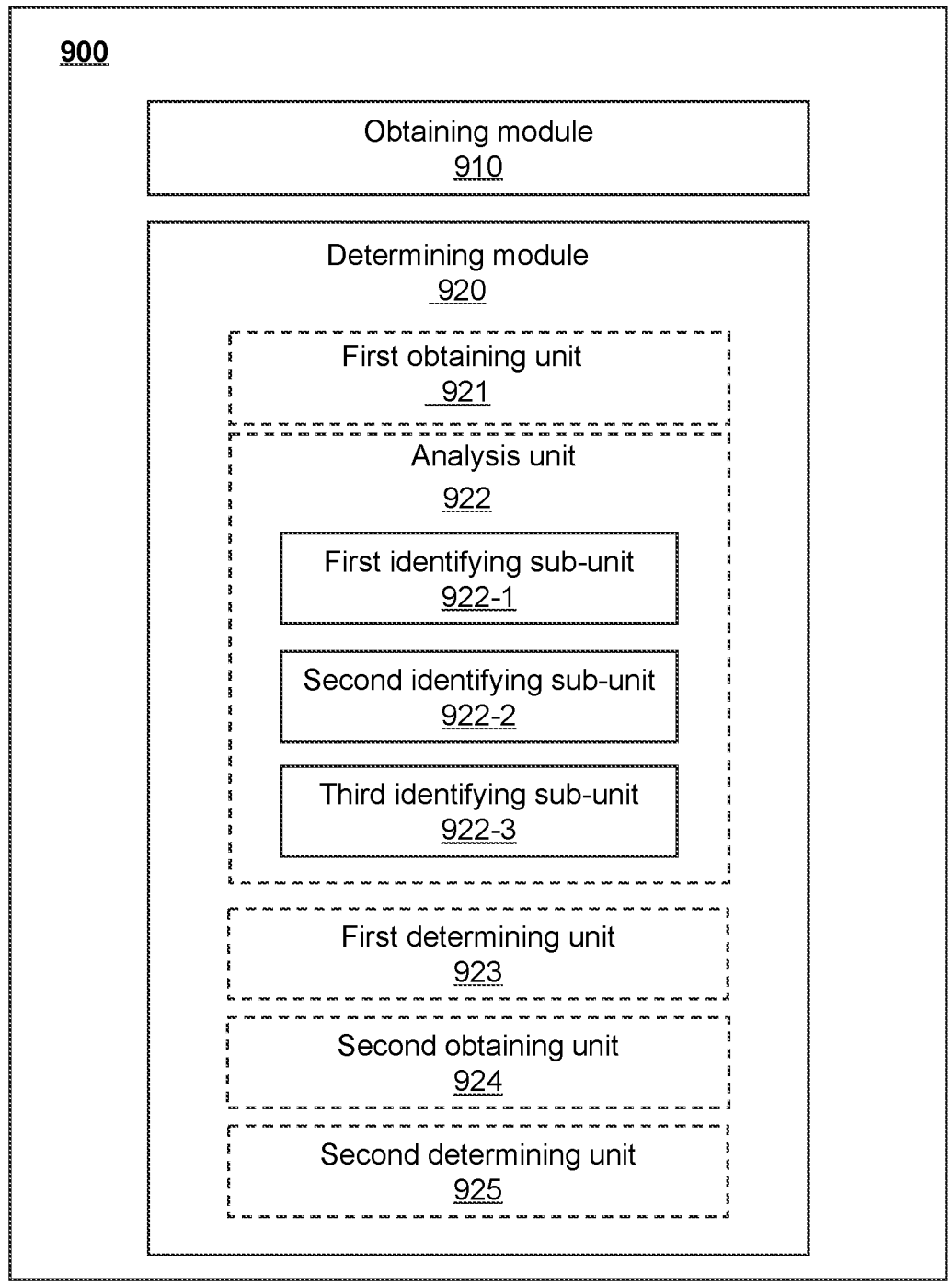
FIG. 9 illustrates a module diagram of a system for determining the parameters of audio device according to some embodiments of the specification.

FIG. 9 illustrates a module diagram of a system for determining the parameters of audio device according to some embodiments of the specification.

In some embodiments, the system 900 may include an obtaining module 910 and a determining module 920. The obtaining module 910 is used to obtain audio information and/or image information of the target space. The determining module 920 is configured to determine the parameters of the target audio device in the target space based on the obtained audio information and/or image information.

In some embodiments, the obtaining module 910 may be used to obtain a panoramic image. In some embodiments, the obtaining module 910 may be used to obtain a panoramic image of a target space where a target audio device is placed, the target audio device has an LED light, and the panoramic image is captured when the LED light is on. In some embodiments, the obtaining module 910 may also be used to obtain a plurality of images of the target space from the mobile terminal; and obtain the panoramic image based on the plurality of images. In some embodiments, the obtaining module 910 may obtain the video information and audio information of the target space where the target audio device is located through the camera and microphone of the user device 140.

In some embodiments, the determining module 920 may further include a first obtaining unit 921, an analysis unit 922, a first determining unit 923, a second obtaining unit 924, and a second determining unit 925.

The first obtaining unit 921 may be used to obtain a listening position. In some embodiments, the first obtaining unit 921 may be used to obtain the listening position of the target space. In some embodiments, the first obtaining unit 921 may also be used to obtain the listening position input by the user from the mobile terminal.

In some embodiments, the first obtaining unit 921 may obtain a plurality of shooting positions according to the video information. Refer to the description of the corresponding content in FIG. 2 for the related description of obtaining multiple shooting positions.

In some embodiments, the first obtaining unit 921 may extract a plurality of image frames from the video information according to a preset time interval; and determine a plurality of shooting positions based on the plurality of image frames. Wherein, two adjacent image frames in the plurality of image frames have an overlapping part.

In some embodiments, the first obtaining unit 921 may determine the first image in the plurality of image frames through an image identifying model, determine the reference position according to the first image, and determine the plurality of shooting positions based on the reference position and the plurality of image frames. Wherein, the first image includes the target audio device. The image identifying model and its related description can be found in the description of the corresponding content in FIG. 3.

In some embodiments, the first obtaining unit 921 may obtain a plurality of shooting positions based on the video information and the motion sensor of the user device 140.

In some embodiments, the first obtaining unit 921 may also construct a VR scene of the target space according to the video information, determine a plurality of test positions according to the VR scene, and acquire the plurality of shooting positions based on the user device 140 moves to the plurality of test positions. Refer to the description of the corresponding content in FIG. 8 for the VR scene of the target space and its related description.

The analysis unit 922 may be used to analyze the panoramic image. In some embodiments, the analysis unit 922 may be used to identify the material, shape, and size of the placed object in the target space.

In some embodiments, the analysis unit 922 may further include a first identifying sub-unit 922-1, a second identifying sub-unit 922-2, and a third identifying sub-unit 922-3.

The first identifying sub-unit 922-1 may be used to identify the position of the target audio device. In some embodiments, the first identifying sub-unit 922-1 may be used to identify the position of the target audio device by identifying the shape or position of the LED light of the target audio device in the panoramic image. In some embodiments, the first identifying sub-unit 922-1 may also be used to identify the target audio device and the photographer of the panoramic image by identifying the shape or position of the LED light of the target audio device in the panoramic image, and determine the position of the target audio device based on the second distance.

The second identifying sub-unit 922-2 may be used to identify the relative distance between the listening position and the target audio device. In some embodiments, the second identifying sub-unit 922-2 may be used to identify a first distance and a first angle between the listening position and the target audio device, based on the listening position and the position of the target audio device.

The third identifying sub-unit 922-3 may be used to identify the information of the placed object and the target space. In some embodiments, the third identifying sub-unit 922-3 may be used to identify the position of the placed object in the target space. In some embodiments, the third identification sub-unit 922-3 may also be used to identify the material, shape, and size of the placed object in the target space.

In some embodiments, the third identification sub-unit 922-3 may also be used to identify at least one of a size of the target space, a standing wave of the target space, a reverberation of the target space, a sensitivity of the target audio device, or a gain formula of the target audio device, or the like.

The first determining unit 923 may be configured to determine the gain of the target audio device based on the analysis result of the panoramic image. In some embodiments, the first determining unit 923 may also be used to inputting the position of the target audio device, the first distance and the first angle between the listening position and the target audio device, the position of the object, the size of the target space, and the wall material of the target space to a trained audio parameter configuration model, and outputting the gain of the target audio device. In some embodiments, the first determining unit 923 may also be used to obtain initial parameters of the target audio device, where the initial parameters include the initial gain of the target audio device, determine at least one optimal listening position from a plurality of listening positions based on the analysis result of the panoramic image and the initial parameter, and adjust the gain of the target audio device based on the optimal listening position. In some embodiments, the first determining unit 923 is configured to determine the parameters of the target audio device according to the plurality of shooting positions and the audio information.

The second obtaining unit 924 may be used to obtain preset parameters of the target audio device. In some embodiments, the second obtaining unit 924 may be used to obtain a preset parameter of at least one audio device in the target audio device, and the preset parameter includes a preset gain of the at least audio device.

The second determining unit 925 may be used to determine the position of the target audio device. In some embodiments, the second determining unit 925 may be configured to determine the target position of the at least one sound based on the listening position and the preset parameters.

It should be understood that the system and its modules shown in FIG. 9 can be implemented in various ways. For example, in some embodiments, the system and its modules may be implemented in hardware, software, or a combination of software and hardware. Wherein the hardware portion may be implemented using dedicated logic; the software portions may be stored in a memory for execution by a suitable instruction execution system, such as a microprocessor or specially designed hardware. Those skilled in the art will appreciate that the methods and systems described above may be implemented using computer executable instructions and/or embodied in processor control code, such code being provided, for example, on a carrier medium such as a diskette, CD- or DVD-ROM, a programmable memory such as read-only memory (firmware), or a data carrier such as an optical or electronic signal carrier. The system and its modules of the present application may be implemented not only by hardware circuits such as very large scale integrated circuits or gate arrays, semiconductors such as logic chips, transistors, or programmable hardware devices such as field programmable gate arrays, programmable logic devices, etc., but also by software executed by various types of processors, for example, or by a combination of the above hardware circuits and software (e.g., firmware).

It should be noted that the above description of the audio parameter determination system 900 and its modules is only for the convenience of description, and does not limit the specification within the scope of the examples mentioned. It can be understood that for those skilled in the art, after understanding the principle of the system, they may arbitrarily combine various modules and/or units, or make up the connection between the sub-system and other modules and/or units. For example, in some embodiments, the obtaining module 910, the identifying module 920, the first obtaining unit 921, the analysis unit 922, the first identifying unit 923, the second obtaining unit 924, and the second identifying unit 925 disclosed in FIG. 9 may be different modules and/or units in a system, may also be one module and/or unit to realize the functions of two or more modules and/or units mentioned above. For another example, the obtaining module 910 and the identifying module 920 may be two modules, or one module may have both obtaining and data processing functions. For another example, the first identifying sub-unit 922-1 and the second identifying sub-unit 922-2 may be two sub-units. When the listening position is the same as the position where the panoramic image is obtained, the first identifying sub-unit 922-1 and the second identifying sub-unit 922-2 can be a sub-unit, and have the function of recognizing the distance between the listening position and the target audio device. Such deformations are all within the protection scope of the specification.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Additionally, the order in which elements and sequences of the processes described herein are processed, the use of alphanumeric characters, or the use of other designations, is not intended to limit the order of the processes and methods described herein, unless explicitly claimed. While various presently contemplated embodiments of the invention have been discussed in the foregoing disclosure by way of example, it is to be understood that such detail is solely for that purpose and that the appended claims are not limited to the disclosed embodiments, but, on the contrary, are intended to cover all modifications and equivalent arrangements that are within the spirit and scope of the embodiments herein. For example, although the system components described above may be implemented by hardware devices, they may also be implemented by software-only solutions, such as installing the described system on an existing server or mobile device.

Similarly, it should be noted that in the preceding description of embodiments of the application, various features are sometimes grouped together in a single embodiment, figure, or description thereof for the purpose of streamlining the disclosure aiding in the understanding of one or more of the embodiments. This method of disclosure, however, is not intended to require more features than are expressly recited in the claims. Indeed, the embodiments may be characterized as having less than all of the features of a single embodiment disclosed above.

Numbers describing attributes, quantities, etc. are used in some embodiments, it being understood that such numbers used in the description of the embodiments are modified in some instances by the use of the modifier "about", "approximately" or "substantially". Unless otherwise indicated, "about", "approximately" or "substantially" indicates that the number allows a variation of ±20%. Accordingly, in some embodiments, the numerical parameters used in the specification and claims are approximations that may vary depending upon the desired properties of the individual embodiments. In some embodiments, the numerical parameter should take into account the specified significant digits and employ a general digit preserving approach. Notwithstanding that the numerical ranges and parameters setting forth the broad scope of the range are approximations, in the specific examples, such numerical values are set forth as precisely as possible within the scope of the application.

Each patent, patent application publication, and other material, such as articles, books, specifications, publications, documents, articles, and the like, cited in this application is hereby incorporated by reference in its entirety. Except where the application is filed in a manner inconsistent or contrary to the present disclosure, and except where the claim is filed in its broadest scope (whether present or later appended to the application) as well. It is noted that the descriptions, definitions and/or use of terms in this application shall control if they are inconsistent or contrary to the statements and/or uses of the present application in the material attached to this application.

Finally, it should be understood that the embodiments described herein are merely illustrative of the principles of the embodiments of the present application. Other variations are also possible within the scope of the present application. Thus, by way of example, and not limitation, alternative configurations of the embodiments of the present application can be viewed as being consistent with the teachings of the present application. Accordingly, embodiments of the present application are not limited to those explicitly described and depicted herein.

We claim:

1. A method for determining parameters of audio devices, comprising:
    obtaining a panoramic image or audio information of a target space where a target audio device is located, wherein the target audio device has an LED lamp and the panoramic image is captured under a condition that the LED lamp of the target audio device is on;
    obtaining a listening position of the target space;
    determining an analysis result of the panoramic image by analyzing the panoramic image, wherein the analysis result of the panoramic image including at least one of a position of the target audio device, a first distance and a first angle between the listening position and the target audio device, a position of an object placed in the target space, a size of the target space, and a wall material of the target space; and
    determining a gain of the target audio device based on the analysis result of the panoramic image.

2. The method of claim 1, wherein
    the determining an analysis result of the panoramic image by analyzing the panoramic image; further comprising:
    identifying the position of the target audio device by identifying a shape or a position of the LED light of the target audio device in the panoramic image;
    identifying the first distance and the first angle between the listening position and the target audio device, based on the listening position and the position of the target audio device; and
    identifying the position of the object placed in the target space, the size of the target space, and the wall material of the target space; and
    the determining a gain of the target audio device based on the analysis result of the panoramic image; further comprising:
    inputting the position of the target audio device, the first distance and the first angle between the listening position and the target audio device, the position of the object, the size of the target space, and the wall material of the target space to a trained audio parameter configuration model, and
    outputting the gain of the target audio device.

3. The method of claim 2, wherein the identifying the position of the target audio device by identifying the shape or the position of the LED light of the target audio device in the panoramic image comprises:
    identifying a second distance between the target audio device and a photographer of the panoramic image, by identifying the shape or the position of the LED light of the target audio device in the panoramic image; and
    determining the position of the target audio device based on the second distance.

4. The method of claim 2, wherein
    the determining the gain of the target audio device based on the analysis result of the panoramic image further comprises:
    obtaining an initial parameter of the target audio device, wherein the initial parameter comprises an initial gain of the target audio device;
    determining at least one optimal listening position from a plurality of listening positions based on the analysis result of the panoramic image and the initial parameter; and
    adjusting the gain of the target audio device based on the at least one optimal listening position.

5. The method of claim 2, further comprising:
    obtaining a preset parameter of the target audio device, wherein the preset parameter includes a preset gain of the target audio device; and
    determining a target position of the target audio device based on the listening position and the preset parameter.

6. The method of claim 2, wherein the obtaining a panoramic image or audio information of the target space where the target audio device is located comprises:
    obtaining the panoramic image of the target space, comprising:
    obtaining a plurality of images of the target space from a mobile terminal; and
    obtaining the panoramic image based on the plurality of images.

7. The method of claim 2, wherein the obtaining the listening position of the target space further comprises:
    obtaining the listening position input by a user from a mobile terminal.

8. The method of claim 2, whrein the analyzing the panoramic image further comprises:
    identifying a material, a shape and a size of the object placed in the target space.

9. The method of claim 2, whrein the analyzing the panoramic image further comprises:
    identifying at least one of a size of the target space, a standing wave of the target space, a reverberation of the target space, a sensitivity of the target audio device, or a gain formula of the target audio device.

10. The method of claim 2, further comprising:
    determining an output power of the target audio device and a delay of the target audio device, based on the analysis result of the panoramic image.

11. A system for determining parameters of audio devices, comprising:
- at least one storage device comprising a set of instructions; and
- at least one processor configured to communicate with the at least one storage device, wherein, when the set of instructions is executed, the at least one processor is configured to direct the system to perform operations including:
- obtaining a panoramic image or audio information of a target space where a target audio device is located, wherein the target audio device has an LED lamp and the panoramic image is captured under a condition that the LED lamp of the target audio device is on;
- obtaining a listening position of the target space;
- determining an analysis result of the panoramic image by analyzing the panoramic image, wherein the analysis result of the panoramic image including at least one of a position of the target audio device, a first distance and a first angle between the listening position and the target audio device, a position of an object placed in the target space, a size of the target space, and a wall material of the target space; and
- determining a gain of the target audio device based on the analysis result of the panoramic image.

12. The system of claim 11, wherein
the determining an analysis result of the panoramic image by analyzing the panoramic image; further comprising:
- identifying the position of the target audio device by identifying a shape or a position of the LED light of the target audio device in the panoramic image;
- identifying the first distance and the first angle between the listening position and the target audio device, based on the listening position and the position of the target audio device; and
- identifying the position of the object placed in the target space, the size of the target space, and the wall material of the target space; and the determining a gain of the target audio device based on the analysis result of the panoramic image; further comprising:
- inputing the position of the target audio device, the first distance and the first angle between the listening position and the target audio device, the position of the object, the size of the target space, and the wall material of the target space to a trained audio parameter configuration model, and
- outputing the gain of the target audio device.

13. The system of claim 11, wherein
the panoramic image comprises a video information of the target space;
the obtaining a panoramic image or the audio information of the target space where the target audio device is located comprises:
- obtaining the video information and the audio information of the target space where the target audio device is located through a camera and a microphone of a mobile terminal.

14. A non-transitory computer-readable medium, comprising instructions that, when executed by at least one processor, direct the at least one processor to perform operations including:
- obtaining a panoramic image or audio information of a target space where a target audio device is located, wherein the target audio device has an LED lamp and the panoramic image is captured under a condition that the LED lamp of the target audio device is on;
- obtaining a listening position of the target space;
- determining an analysis result of the panoramic image by analyzing the panoramic image, wherein the analysis result of the panoramic image including at least one of a position of the target audio device, a first distance and a first angle between the listening position and the target audio device, a position of an object placed in the target space, a size of the target space, and a wall material of the target space; and
- determining a gain of the target audio device based on the analysis result of the panoramic image.

15. The non-transitory computer-readable medium of claim 14, wherein
the determining an analysis result of the panoramic image by analyzing the panoramic image; further comprising:
- identifying the position of the target audio device by identifying a shape or a position of the LED light of the target audio device in the panoramic image;
- identifying the first distance and the first angle between the listening position and the target audio device, based on the listening position and the position of the target audio device; and
- identifying the position of the object placed in the target space, the size of the target space, and the wall material of the target space; and the determining a gain of the target audio device based on the analysis result of the panoramic image; further comprising:
- inputing the position of the target audio device, the first distance and the first angle between the listening position and the target audio device, the position of the object, the size of the target space, and the wall material of the target space to a trained audio parameter configuration model, and
- outputing the gain of the target audio device.

* * * * *